US012741242B2

(12) United States Patent
Jeong et al.

(10) Patent No.: US 12,741,242 B2
(45) Date of Patent: Sep. 22, 2026

(54) GARMENT CARE APPARATUS AND CONTROL METHOD THEREFOR

(71) Applicant: SAMSUNG ELECTRONICS CO., LTD., Suwon-si (KR)

(72) Inventors: Hyunku Jeong, Suwon-si (KR); Jayeon Seo, Suwon-si (KR); Hyongsoo Noh, Suwon-si (KR); Kisup Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 801 days.

(21) Appl. No.: 18/094,720

(22) Filed: Jan. 9, 2023

(65) Prior Publication Data

US 2023/0158427 A1 May 25, 2023

Related U.S. Application Data

(63) Continuation of application No. PCT/KR2021/006336, filed on May 21, 2021.

(30) Foreign Application Priority Data

Jul. 9, 2020 (KR) ........................ 10-2020-0084713

(51) Int. Cl.

| | |
|---|---|
| ***B01D 35/02*** | (2006.01) |
| ***B01D 35/30*** | (2006.01) |
| ***B01D 41/04*** | (2006.01) |
| ***D06F 58/45*** | (2020.01) |

(52) U.S. Cl.

CPC ............. *B01D 35/02* (2013.01); *B01D 35/30* (2013.01); *B01D 41/04* (2013.01); *D06F 58/45* (2020.02)

(58) Field of Classification Search

CPC ......... B01D 35/02; B01D 41/04; B01D 35/30
USPC .............................................................. 34/82
See application file for complete search history.

(56) References Cited

U.S. PATENT DOCUMENTS 5,098,767 A * 3/1992 Linnersten ............. B01D 46/10 55/497
5,679,122 A * 10/1997 Moll .................... B01D 46/523 55/497
5,868,889 A 2/1999 Kähler
9,975,072 B2 5/2018 Capuani et al.
10,279,301 B2 5/2019 Zhang
(Continued)

FOREIGN PATENT DOCUMENTS

CN 201755438 U * 3/2011
JP 9-507155 7/1997
(Continued)

OTHER PUBLICATIONS

English Translation of CN 201755438 U (Year: 2011).*
(Continued)

*Primary Examiner* — Connor J Tremarche
(74) *Attorney, Agent, or Firm* — STAAS & HALSEY LLP

(57) ABSTRACT

A garment care apparatus comprises: a main body including a garment care room formed therein, the garment care room having a front side opened; and a filter installable in the main body to collect dust included in the air in the garment care space, wherein the filter comprises a bending guide formed by cutting away parts of the filter, and the cut parts and uncut parts of the filter make the filter bendable.

18 Claims, 20 Drawing Sheets

(56) References Cited

U.S. PATENT DOCUMENTS

| | | | | |
|---|---|---|---|---|
| 2016/0279546 | A1 | 9/2016 | Capuani et al. | |
| 2017/0342651 | A1* | 11/2017 | Choi | D06F 58/44 |
| 2018/0021716 | A1 | 1/2018 | Li et al. | |
| 2018/0126313 | A1* | 5/2018 | Canonico | B01D 46/0001 |
| 2018/0171536 | A1 | 6/2018 | Park | |
| 2018/0334767 | A1* | 11/2018 | Kim | D06B 1/02 |
| 2019/0321762 | A1* | 10/2019 | Smith | B08B 3/02 |
| 2019/0330790 | A1 | 10/2019 | Ko et al. | |
| 2020/0056321 | A1* | 2/2020 | Jeong | D06F 58/36 |
| 2021/0071345 | A1* | 3/2021 | Lee | D06F 73/02 |
| 2021/0222350 | A1 | 7/2021 | Kang et al. | |

FOREIGN PATENT DOCUMENTS

| | | | |
|---|---|---|---|
| JP | 2000-189736 | 7/2000 | |
| JP | 6247307 | 12/2017 | |
| KR | 1999-009555 | 3/1999 | |
| KR | 100720763 B1 * | 5/2004 | B01D 46/521 |
| KR | 10-2005-0041657 | 5/2005 | |
| KR | 10-0720763 | 5/2007 | |
| KR | 10-0823328 | 4/2008 | |
| KR | 10-2011-0067754 | 6/2011 | |
| KR | 10-1113881 | 2/2012 | |
| KR | 20-0465648 | 3/2013 | |
| KR | 10-1341609 | 12/2013 | |
| KR | 10-2014-0089118 | 7/2014 | |
| KR | 10-2016-0020020 | 2/2016 | |
| KR | 10-2017-0107529 | 9/2017 | |
| KR | 10-1783636 | 10/2017 | |
| KR | 10-2018-0000846 | 1/2018 | |
| KR | 10-2018-0065313 | 6/2018 | |
| KR | 10-2018-0070175 | 6/2018 | |
| KR | 10-2020-0004169 | 1/2020 | |
| KR | 10-2020-0021336 | 2/2020 | |
| KR | 10-2132401 | 7/2020 | |

OTHER PUBLICATIONS

English Translation of KR10720763 B1 (Year: 2007).*

International Search Report dated Sep. 14, 2021 issued in PCT Application No. PCT/KR2021/006336.

Written Opinion dated Sep. 14, 2021 issued in PCT Application No. PCT/KR2021/006336.

Office Action dated Jun. 20, 2025 issued in Korean Application No. 10-2020-0084713.

* cited by examiner

FIG. 13

| CLASSIFICATION | | FILTER OF GARMENT CARE APPARATUS | | | | FILTER OF AIR CLEANER | | | |
|---|---|---|---|---|---|---|---|---|---|
| | | Flat - WATER WASHING | Flat - AIR WASHING | Bending - WATER WASHING | Bending - AIR WASHING | Flat - WATER WASHING | Flat - AIR WASHING | Bending - WATER WASHING | Bending - AIR WASHING |
| PRESSURE LOSS (Pa) @4.5CMM | INITIAL | 17 | 17 | 17 | 17 | 40 | 41 | 41 | 40 |
| | AFTER DUST COLLECTION | 28 | 28 | 27 | 28 | 70 | 73 | 75 | 72 |
| | AFTER WASHING | 23 | 21 | 18 | 17 | 64 | 60 | 58 | 58 |

FIG. 14A

| CLASSIFICATION | | DUST FILTER OF GARMENT CARE APPARATUS | | | |
|---|---|---|---|---|---|
| | | Flat - WATER WASHING | Flat - AIR WASHING | Bending - WATER WASHING | Bending - AIR WASHING |
| INITIAL | 0.3 um | 67.23 | 68.56 | 69.89 | 72.55 |
| | 0.5 um | 66.49 | 64.59 | 65.22 | 65.85 |
| | 1.0 um | 68.61 | 65.40 | 66.04 | 65.40 |
| | 3.0 um | 72.62 | 71.27 | 73.96 | 73.96 |
| | 5.0 um | 72.57 | 76.76 | 73.97 | 76.06 |
| | 10 um | 87.03 | 84.59 | 86.22 | 89.47 |
| AFTER WASHING | 0.3 | 53.78 | 66.27 | 65.70 | 70.86 |
| | 0.5 | 55.41 | 63.51 | 63.05 | 64.09 |
| | 1.0 | 57.18 | 63.44 | 63.40 | 63.44 |
| | 3.0 | 50.83 | 69.37 | 69.03 | 72.48 |
| | 5.0 | 55.64 | 74.71 | 69.53 | 73.52 |
| | 10 | 72.53 | 83.18 | 83.35 | 87.68 |

GARMENT CARE APPARATUS AND CONTROL METHOD THEREFOR

CROSS-REFERENCE TO RELATED APPLICATIONS(S)

This application is a continuation application, under 35 U.S.C. § 111(a), of international application No. PCT/KR2021/006336, filed on May 21, 2021, which claims priority to Korean Patent Application No. 10-2020-0084713, filed on Jul. 9, 2020 in the Korean Intellectual Property Office, the disclosure of which is incorporated by reference herein in its entirety.

FIELD

The present disclosure relates to a garment care apparatus, and more particularly, to a garment care apparatus including an improved filter and a control method thereof.

DESCRIPTION OF RELATED ART

A garment care apparatus is an appliance for clothes care, such as drying wet garments, removing dust gathered on garments or smell permeated in garments, and smoothing out the wrinkles of garments.

In general, the garment care apparatus includes a cabinet forming a garment care room in which garments are accommodated, and a door for opening or closing the cabinet.

The garment care apparatus includes a hot air supplier for supplying hot air to the garment care room to dry garments, and a steam generator for performing refresh functions including removing the wrinkles of garments, deodorization, removing static electricity, etc.

Recently, fine dust watches and warnings are increasing. Fine dust may enter the body to be absorbed into organs or cause a problem in the respiratory organs. In the case in which garments are kept indoor after outdoor activities, dust existing in the garments is diffused to the indoor to pollute the inside air and outside fine dust may enter the respiratory organs.

To remove such fine dust of garments, a dust filter is installed on the internal flow path of a garment care apparatus to remove dust. Generally, the dust filter uses a fibrous material (PP, a non-woven material, etc.) as a physical filtration method to collect and remove fine dust.

The dust filter needs to be periodically replaced because it is a consumable.

SUMMARY

One aspect of the present disclosure provides a garment care apparatus including: a main body including a garment care room formed therein, the garment care room having a front side opened; and a filter installable in the main body and configured to collect dust included in air in the garment care room, wherein the filter includes a bending guide formed by cutting away parts of the filter, and the cut parts and uncut parts of the filter make the filter bendable.

Also, the bending guide may include: a plurality of cut portions formed by cutting away the parts of the filter; and a plurality of bent mountains formed by the plurality of cut portions.

Also, the plurality of cutting portions and the plurality of bent mountains may be alternately arranged.

Also, each of the plurality of bent mountains may have a quadrangle shape.

Also, the garment care apparatus may further include a bending maintaining member configured to maintain a bending state of the filter.

Also, the bending maintaining member may include at least one of a Velcro member, a tape, a buckle, a band, a wire, or a hinge.

Also, the bending maintaining member may be configured to maintain intervals between the plurality of cutting portions and the plurality of bent mountains in a bending state of the filter.

Also, the bending guide may be formed by bending a fabric, performing mini pleating, attaching a frame, and cutting at least one surface of the filter to which the frame is attached.

Also, upon the mini pleating, a hotmelt may be applied in a form of spots onto the filter.

Also, the filter may include a filter body 110, and a filter frame 120 configured to support the filter body 110, and the bending guide may be formed in the filter frame.

The garment care apparatus may further include: a first fan formed inside the main body and adjacent to the filter; an inputter configured to receive a user command including a filter drying command; and a controller configured to control an operation of the first fan the received filter drying command.

The garment care apparatus may further include: a heat exchanger configured to perform heat exchange of the air in the garment care room, the heat exchanger including a compressor; and a second fan being adjacent to the heat exchanger, wherein the controller may control, upon reception of a filter drying command as the user command, an operation of at least one of the first fan, the second fan, and the compressor of the heat exchanger.

The controller may control, based on the received filter drying command, an operation of the second fan, control an operation of the compressor according to elapse of a first reference time, and control an operation of the first fan according to an elapse of a second reference time.

The controller may perform a control operation of stopping an operation of the first fan, an operation of the second fan, and an operation of the compressor of the heat exchanger according to an elapse of a preset drying time.

The controller may control the operation of the first fan so that the first fan rotates at a reference revolution per minute (rpm) or more.

The garment care apparatus may further comprising a detector provided around the filter and configured to detect humidity of ambient air of the filter, wherein the controller may perform a control operation of finishing a filter drying process based on humidity information detected by the detector.

A method for controlling a garment care apparatus including a main body including a garment care room formed therein, and a filter installable in the main body and configured to collect dust included in air in the garment care room, comprising: controlling, in response to receiving a filter drying command, an operation of a first fan adjacent to the filter to perform a filter drying process, and an operation of finishing the filter drying process according to an elapse of a preset drying time.

The performing of the filter drying process may comprise: controlling an operation of a second fan adjacent to a heat exchanger; controlling an operation of a compressor provided in the heat exchanger according to elapse of a first reference time; and controlling an operation of the first fan according to elapse of a second reference time.

The controlling of the operation of the first fan may comprise controlling the operation of the first fan so that the first fan rotates at a reference rpm or more.

The method for controlling the garment care apparatus may further comprise: detecting humidity around the filter during the filter drying process; and finishing the operation of the filter drying process according to an identification that the detected humidity is lower than or equal to reference humidity.

BRIEF DESCRIPTION OF THE DRAWINGS

These and/or other aspects of the disclosure will become apparent and more readily appreciated from the following description of embodiments, taken in conjunction with the accompanying drawings of which:

FIG. 13 is a table showing pressure loss corresponding to before and after washing of a filter (Flat) provided in a garment care apparatus according to an existing technique, and pressure loss corresponding to before and after washing of a filter (Bending) provided in a garment care apparatus according to an embodiment of the disclosure.

FIG. 14A is a table showing filter performance after a filter (Flat type) provided in a garment care apparatus according to an existing technique is washed four times with water and air, and filter performance after a filter (Bending type) provided in a garment care apparatus according to an embodiment of the disclosure is washed four times with water and air.

DETAILED DESCRIPTION

Figure 1:
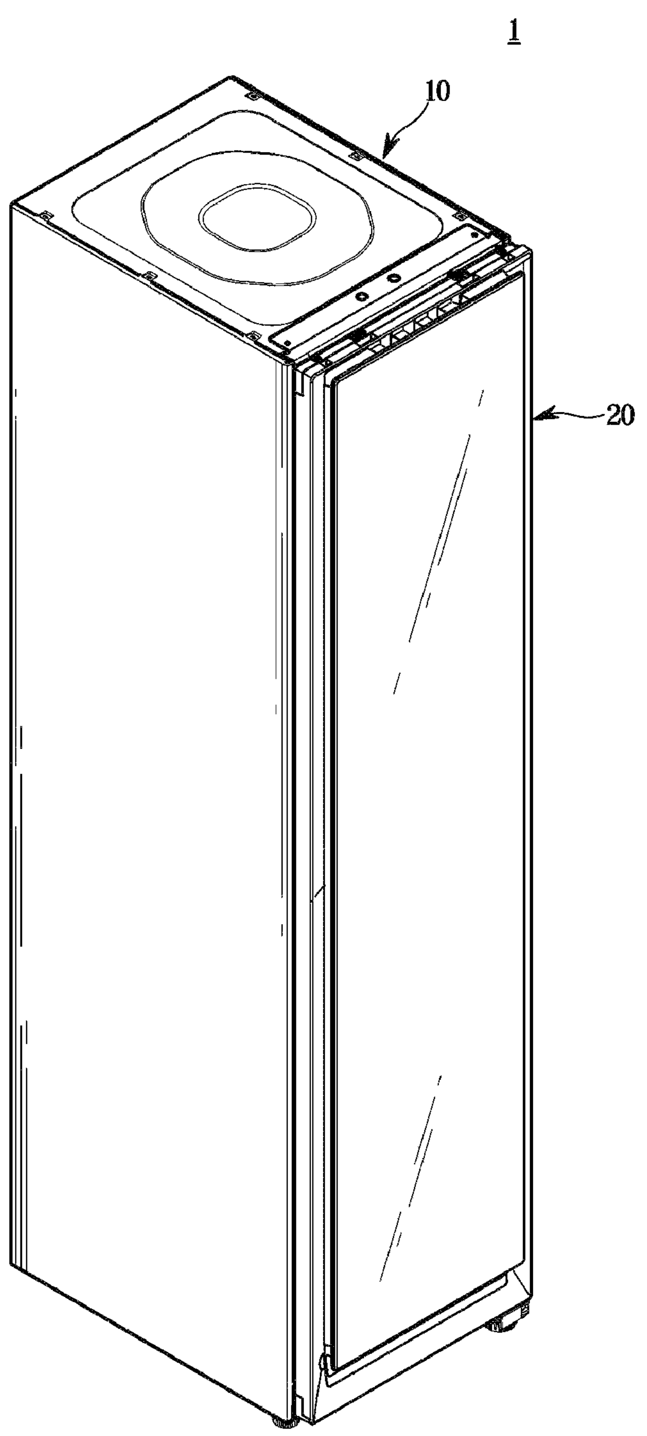
FIG. 1 is a perspective view of a garment care apparatus according to an embodiment of the disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. It is to be understood that the singular forms "a," "an," and "the" include plural referents unless the context clearly dictates otherwise. It will be understood that the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., used in the present specification may be used to describe various components, these components should not be limited by these terms. These terms are only used to distinguish one component from another. For example, a first component could be termed a second component, and, similarly, a second component could be termed a first component, without departing from the scope of the disclosure. The term "and/or" includes any and all combinations of one or more of associated listed items.

An aspect of the disclosure provides a garment care apparatus having a filter of an improved structure.

Another aspect of the disclosure provides a garment care apparatus capable of caring garments more cleanly by enabling a consumer to easily wash a filter.

Still another aspect of the disclosure provides a garment care apparatus having a filter of an improved structure formed of a washable material to enable a consumer to efficiently wash the filter in order to extend a life cycle of the filter.

Still yet another aspect of the disclosure provides a garment care apparatus capable of drying a filter washed with water and a control method thereof.

According to an embodiment of the disclosure, a consumer may manage garments more cleanly by easily washing a filter installed inside a garment care apparatus.

Also, because a filter is formed of a washable material, the disclosure may extend a life cycle of the filter by enabling a consumer to wash the filter.

Also, because a filter has a bendable structure, the disclosure may wash the filter efficiently by bending the filter to remove dust collected in bent portions and wash edges of the filter.

By rapidly and automatically drying a wet filter washed with water through a filter drying algorithm, the disclosure may prevent degradation of the filter.

By outputting information about a washing time of a filter, the disclosure may induce a consumer to wash the filter at an appropriate time, and automatically finish drying the filter based on a change in humidity of air by the filter during drying of the filter, thereby improving drying efficiency of the filter.

The disclosure may prevent overdrying of a filter and energy consumption caused by an increase of a drying time, and prevent half-drying of the filter and off-flavor generation caused by half-drying.

Hereinafter, an embodiment of the disclosure will be described in detail with reference to the accompanying drawings.

Figure 2:
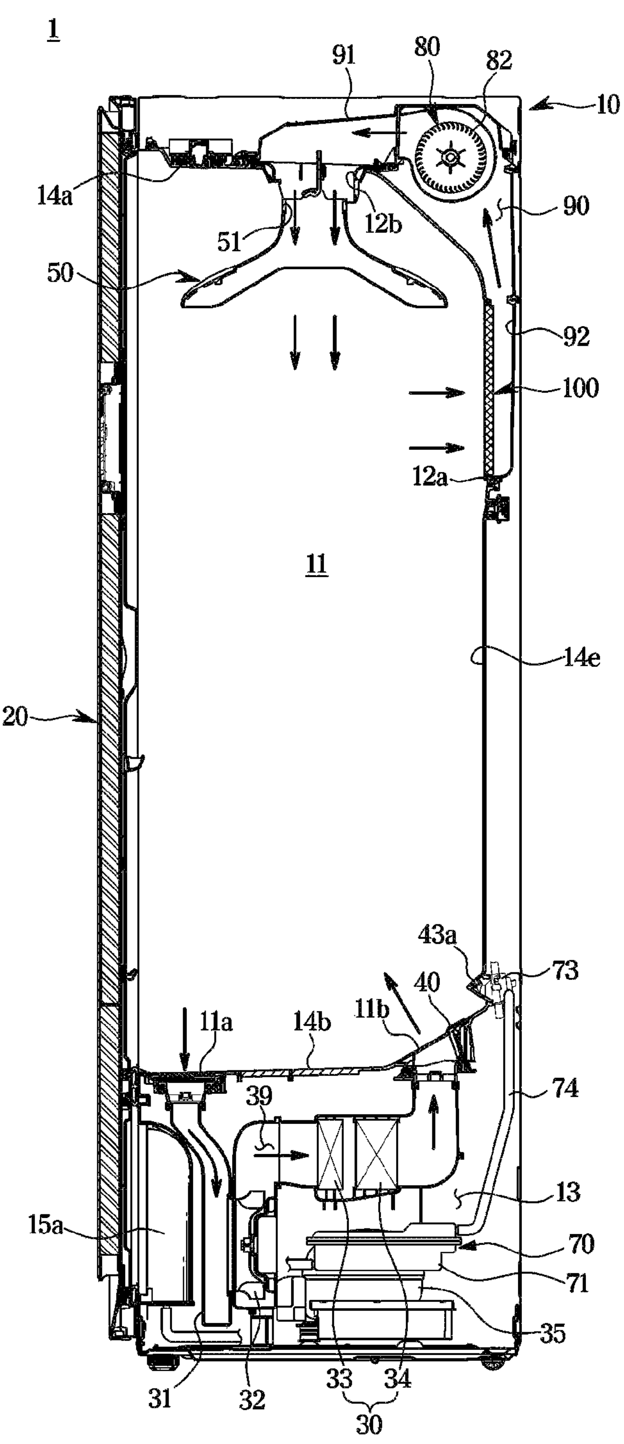
FIG. 2 is a cross-sectional view of a garment care apparatus according to an embodiment of the disclosure.
Figure 3:
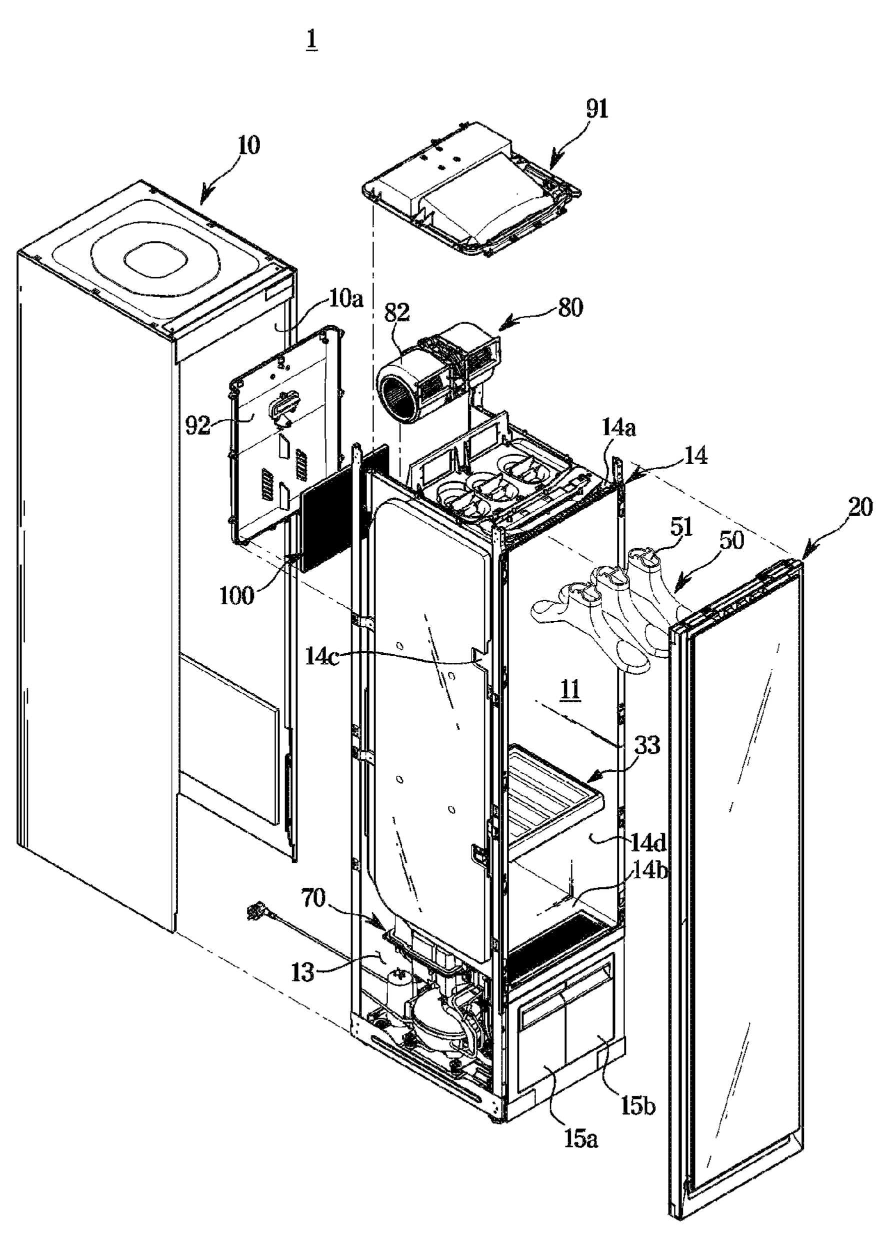
FIG. 3 is an exploded perspective view of a garment care apparatus according to an embodiment of the disclosure.
Figure 4:
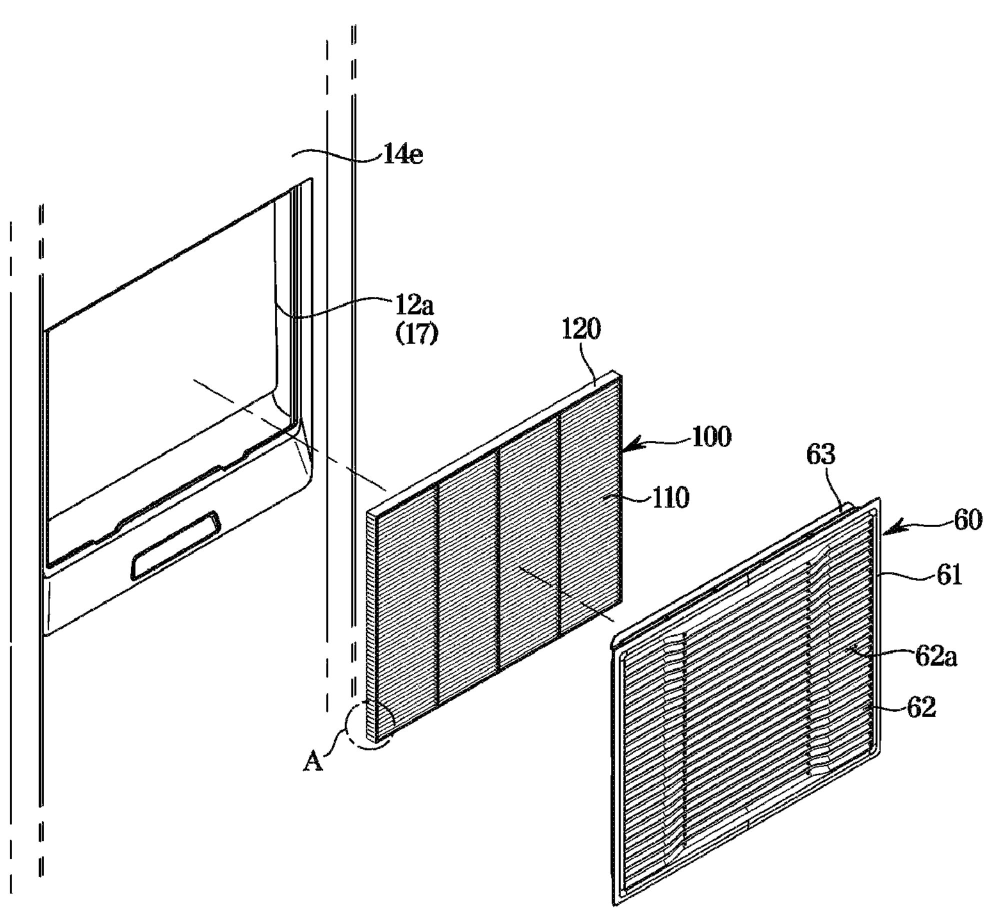
FIG. 4 is an exploded perspective view of a filter installed in a garment care apparatus according to an embodiment of the disclosure.

FIG. 1 is a perspective view of a garment care apparatus according to an embodiment of the disclosure, FIG. 2 is a cross-sectional view of a garment care apparatus according to an embodiment of the disclosure, FIG. 3 is an exploded perspective view of a garment care apparatus according to an embodiment of the disclosure, and FIG. 4 is an exploded perspective view of a filter installed in a garment care apparatus according to an embodiment of the disclosure.

As shown in FIGS. 1 to 4, a garment care apparatus 1 may include a main body 10 forming an appearance, a door 20 rotatably coupled with the main body 10, a garment care room 11 which is provided inside the main body 10 and in which garments are accommodated and cared, a garment supporting member 50 provided inside the garment care room 11 to hold garments, and a machine room 13 in which a heat exchanger 30 for heating or dehumidifying inside air of the garment care room 11 is provided.

The main body 10 may form the garment care room 11 therein, and be in a shape of a rectangular parallelepiped of which one side opens. In a front side of the main body 10, an opening 10*a* may be formed. In the opening 10*a* of the main body 10, a door 20 may be rotatably coupled with the main body 10 to open or close the main body 10. The door 20 may open or close the garment care room 11. The door 20 may be installed on the main body 10 through a connecting member such as a hinge 101.

The garment care room 11 may include a top plate 14*a*, a bottom plate 14*d*, a left plate 14*c*, a right plate 14*d*, and a rear plate 14*e* constituting an internal cabinet 14.

The garment care room 11 may form a space in which garments are accommodated. Inside the garment care room 11, the garment supporting member 50 on which garments are hung and supported may be provided. The garment supporting member 50 may be removably installed in an upper space of the garment care room 11. At least one or a plurality of garment supporting members 50 may be provided. The garment supporting member 50 may be formed in a shape of a hanger capable of hanging a garment thereon. The garment supporting member 50 may be configured to pass air therethrough. Dust or foreign materials gathered in a garment may be removed by air supplied to inside of the garment supporting member 50.

The garment care room 11 may include a first air current inlet 11*a*, a second air current inlet 12*a*, a first air current outlet 11*b*, a second air current outlet 12*b*, and a steam outlet 43*a*. The first air current inlet 11*a* and the first air current outlet 11*b* may be formed in a bottom of the garment care room 11. The first air current inlet 11*a* may be positioned in a front portion of the bottom of the garment care room 11, and the first air current outlet 11*b* may be positioned in a rear portion of the bottom of the garment care room 11. The second air current inlet 12*a* may be formed in the rear plate of the garment care room 11. The second air current outlet 12*b* may be formed at a center of a top of the garment care room 11. The second air current inlet 12*a* may be adjacent to the second air current outlet 12*b*.

In the first air current outlet 11*b*, an outlet grill 40 may be provided to uniformly distribute an air current to the inside of the garment care room 11.

The second air current outlet 12*b* of the garment care room 11 may be connected with the garment supporting member 50. Air discharged through the second air current outlet 12*b* may be transferred to a garment hung on the garment supporting member 50 through an air hole 51 formed in the garment supporting member 50.

In a lower space of the main body 10, a drain tank 15*a* and a water tank 15*b* that are detachable from the main body 10 may be installed. The drain tank 15*a* and the water tank 15*b* may be positioned below the garment care room 11. The drain tank 15*a* may be provided to easily process condensed water. The water tank 15*b* may store water required for a steam generating device 70 which will be described below to generate a steam. Water of the water tank 15*b* may be supplied to the steam generating device 70 and used to generate a steam. The water tank 15*b* may be detachably installed in the main body 10 to easily add water.

The drain tank 15*a* and the water tank 15*b* may be positioned in front of the machine room 13. The machine room 13 may be provided in the lower space of the main body 10. The machine room 13 may be provided below the garment care room 11. The machine room 13 may include the heat exchanger 30 for dehumidifying and heating inside air of the garment care room 11 as necessary.

Inside the machine room 13, a blow fan 32, the heat exchanger 30, and the steam generating device 70 may be positioned.

The blow fan 32 may suck air into inside of the machine room 13, and move air to the inside of the garment care room 11 from below the garment care room 11. In other words, the blow fan 32 may move air from below the garment care room 11 toward an up direction of the garment care room 11. The blow fan 32 may include a motor for generating a rotation force and a blade rotating by the motor.

The blow fan 32 may be a centrifugal fan for sucking air in an axial direction and discharging air outward in a radial direction, although not limited thereto.

Air moving by the blow fan 32 may be dried by passing through the heat exchanger 30. Thereby, a garment positioned inside the garment care room 11 may receive the dried air from below the garment care room 11.

The heat exchanger 30 may supply hot air to the inside of the garment care room 11. The heat exchanger 30 may include an evaporator 33, a compressor 35, and a condenser 34 through which a refrigerant circulates to dehumidify and heat air.

A refrigerant may be evaporated in the evaporator 33 of the heat exchanger 30 to absorb latent heat of surrounding air, condense water in the air, and remove the water. Also, a refrigerant condensed in the condenser 34 via the compressor 35 may emit latent heat toward surrounding air to heat the surrounding air. That is, the evaporator 33 and the condenser 34 may function as a heat exchanger such that air entered the machine room 13 by the blow fan 32 may be dehumidified and heated by passing through the evaporator 33 and the condenser 34 sequentially.

The heat exchanger 30 installed in the machine room 13 may include a first duct 31 connecting the evaporator 33, the condenser 34, and the blow fan 32 with each other, and the first duct 31 may be connected with the garment care room 11 to form a first circulation flow path 39 circulating through the garment care room 11 and the first duct 31.

The first duct 31 may be connected with the first air current inlet 11*a* and the first air current outlet 11*b* of the garment care room 11. Air of the garment care room 11 may enter the first duct 31 through the first air current inlet 11*a*, and the air may be dehumidified and then again discharged to the garment care room 11 through the first air current outlet 11*b*.

The first duct 31 may dehumidify air entered through the first air current inlet 11*a* and discharge the dehumidified air to the first air current outlet 11*b*. The blow fan 32 may be provided on the first duct 31 and suck air of the garment care room 11 into the first duct 31.

Air of the garment care room 11 may enter the first circulation flow path 39 through the first air current inlet 11*a*. The air may be dehumidified and heated by passing through the heat exchanger 30 and the dehumidified and heated air may be again discharged to the garment care room 11 through the first air current outlet 11*b*.

The steam generating device 70 may be positioned in the machine room 13. The steam generating device 70 may receive water from the water tank 15*b* of the machine room 13 to generate a steam.

The steam generating device 70 may include a steam generator 71 connected with the water tank 15*b* to receive water and generate a steam, and a steam supply pipe 74 for guiding the generated steam to a steam sprayer 74 which will be described blow. The steam sprayer 73 may be positioned in a rear, lower area of the garment care room 11. A heater (not shown) may be installed inside the steam generator 71 to heat water.

The garment care room 11 may include a blower 80 for moving inside air. The garment care room 11 may include a second duct 91, and the blower 80 may be installed inside the second duct 91. The second duct 91 may communicate with the garment care room 11 to form a second circulation flow path 90 circulating through the garment care room 11 and the second duct 91. The blower 80 may be positioned on the second circulation flow path 90. The second ducts 91 and 92 may be formed behind the second air current inlet 12*a* of the garment care room 11. The second duct 91 may be positioned in an upper portion of the rear plate of the garment care room 11 and include a filter 100 therein.

The blower 80 may include a blow fan 82.

The blow fan 82 may be provided above the garment care room 11. The blow fan 82 may move air from above the garment care room 11 toward a down direction of the garment care room 11. The blow fan 82 may include a motor for generating a rotation force, and a blade rotating by the motor.

The blow fan 82 may be a centrifugal fan for sucking air in an axial direction and discharging air outward in a radial direction, although not limited thereto.

The blow fan 82 provided above the garment care room 11 may be referred to as an upper fan or a first fan, and the motor provided in the first fan may be referred to as a first motor.

Also, the blow fan 32 provided below the garment care room 11 may be referred to as a lower fan or a second fan, and the motor provided in the second fan may be referred to as a second motor.

The second duct 91 may be connected with the second air current inlet 12*a* and the second air current outlet 12*b* of the garment care room 11. The second air current outlet 12*b* may be connected with the garment supporting member 50 to transfer air of the second duct 91 to the garment supporting member 50.

The blower 80 positioned inside the second duct 91 may suck inside air of the garment care room 11 through the second air current inlet 12*a* and discharge the sucked air to a second duct outlet 71*a* and the second air current outlet 12*b*.

Inside air of the garment care room 11, entered the second duct 91, may be filtered by the filter 100 of the second air current inlet 12*a*. Dust and smell contained in the air entered the second duct 91 may be removed by the filter 100.

The garment care apparatus 1 may operate in a state in which a garment is hung on the garment supporting member 50 and the door 20 is closed. At this time, in the garment care room 11, air may circulate along the first circulation flow path 39 and the second circulation flow path 90.

The filter 100 may be provided on the second air current inlet 12*a* formed in the rear plate 14*e* of the garment care room 11. The second air current inlet 12*a* may include a filter installing portion 17 for installing the filter 100. The filter installing portion 17 may be provided at a location corresponding to the second air current inlet 12*a*. A filter cover 60 may be installed in the filter installing portion 17.

The filter cover 60 may cover the filter 100. The filter cover 60 may be formed with a size and shape corresponding to the second air current inlet 12*a*. The filter cover 60 may be formed with a size and shape corresponding to the filter installing portion 17. The filter cover 60 may cover the filter 100. The filter 100 may be installed in the filter cover 60. The filter 100 may be detachably installed in the filter cover 60.

The filter cover 60 may include a cover frame 61, a grill 62 formed in a front surface of the cover frame 61, and a filter installing portion 63 at which the filter 100 is detachably installed on a rear surface of the cover frame 61.

The cover frame 61 of the filter cover 60 may be in a shape of a rectangle. In the cover frame 61, a handle (not shown) which a user grips to replace and wash the filter 100 may be formed.

The grill 62 may include a grill inlet 62*a* which is formed in the front surface of the filter cover 60 and through which inside air of the garment care room 11 enters the second air current inlet 12*a*. Air of the garment care room 11, entering through the grill inlet 62*a*, may enter through the second air current inlet 12*a*, be filtered by the filter 100, and then move through the second duct 91.

The filter 100 may be installed at the filter installing portion 63 of the filter cover 60. The filter installing portion 63 may be formed with a size and shape corresponding to the filter 100. The filter installing portion 63 may accommodate the filter 100.

The filter 100 may filter air entered through the grill inlet 62*a*.

The filter 100 may be positioned behind the filter cover 60. Preferably, the filter 100 may have a size corresponding to the second air current inlet 12*a*. The filter 100 may be fixed to the filter installing portion 63 of the filter cover 60. The filter cover 60 may fix the filter 100 and prevent the filter 100 from departing from the filter cover 60.

The filter 100 may include a filter body 110 through which air passes and is purified, and a filter frame 120 for supporting the filter body 110. The filter 100 may be bendable. The filter 100 may be bendable to enable a consumer to wash the filter 100. The filter 100 may include a bending guide 200 provided by cutting at least one surface of the filter 100 such that the filter 100 is bendable. The bending guide 200 may be positioned in the filter frame 120 of the filter 100.

Figure 5:
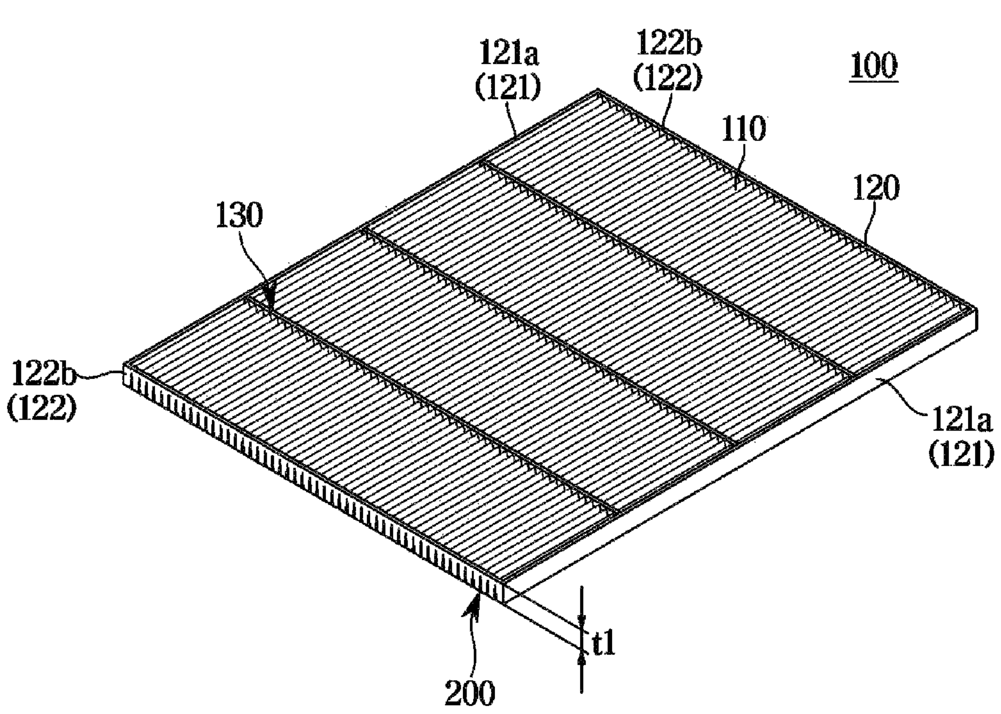
FIG. 5 is a perspective view of a filter according to an embodiment of the disclosure.
Figure 6:
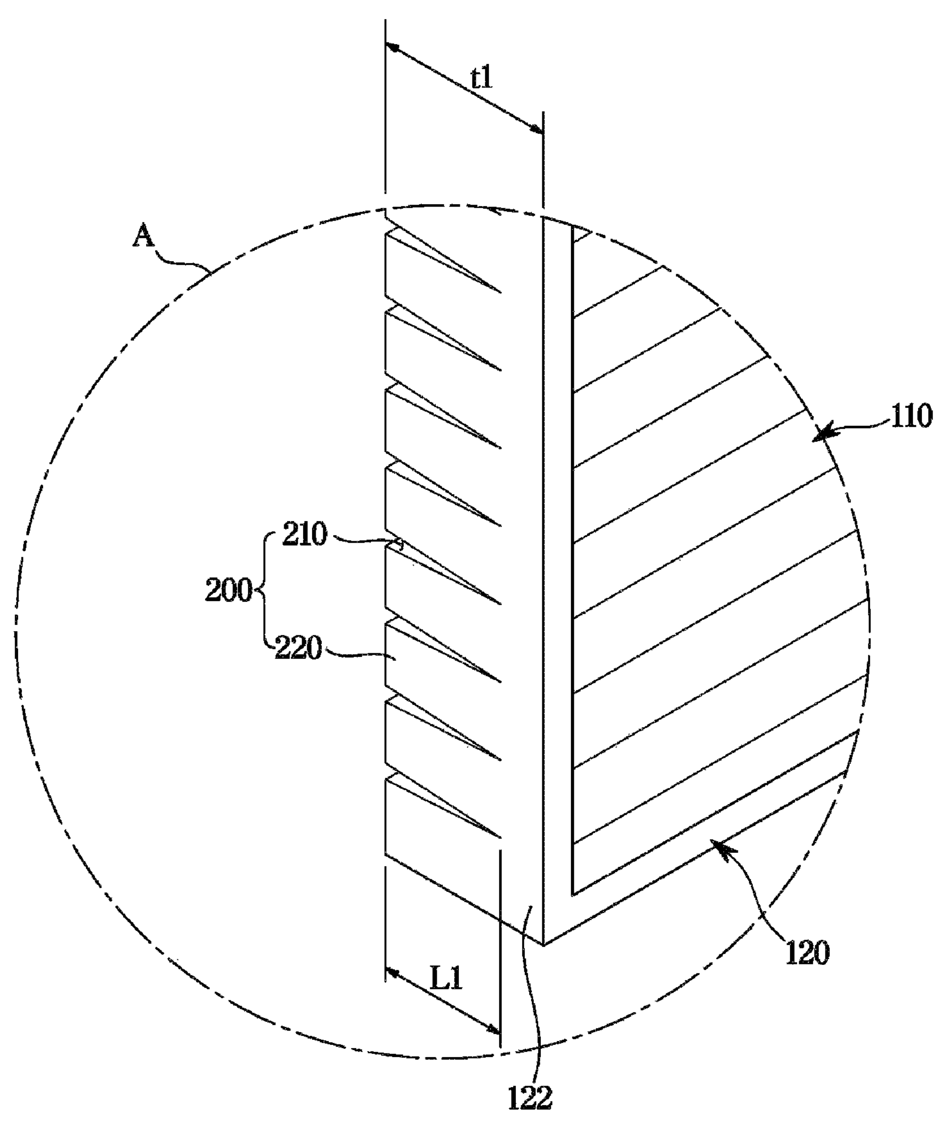
FIG. 6 is an enlarged view of an area A of FIG. 4.
Figure 7:
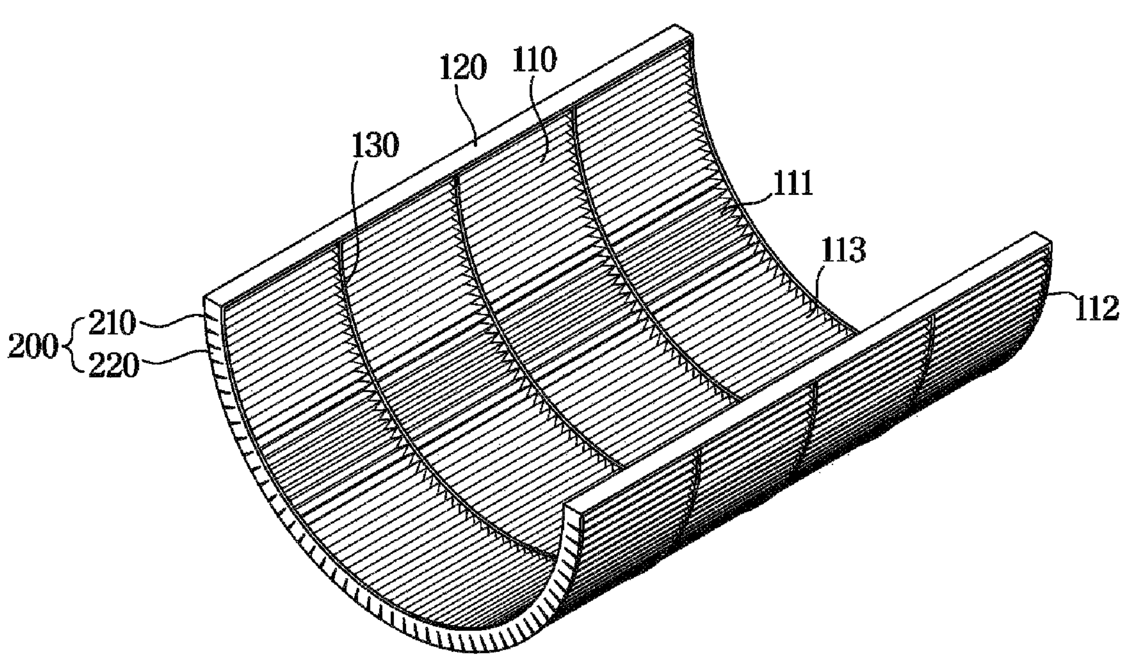
FIG. 7 shows a filter being in a bending state, according to an embodiment of the disclosure.

FIG. 5 is a perspective view of a filter according to an embodiment of the disclosure, FIG. 6 is an enlarged view of an area A of FIG. 4, and FIG. 7 shows a filter being in a bending state, according to an embodiment of the disclosure.

As shown in FIGS. 5 to 7, the filter 100 installed in the garment care apparatus 1 may need to be replaced or washed. The filter may have a bending structure that is advantageous in pressure loss and efficiency to maximize performance as a physical filtration filter.

The filter 100 may include the filter body 110 and the filter frame 120 for supporting the filter body 110.

The filter body 110 may include a high functional, high performance filter formed of a new material (PP) that is resistant to high temperature and high humidity. The filter body 110 may include various kinds of filters for filtering out or removing pollutants, germs, viruses, dust, etc. in air. The filter body 110 may be a High Efficiency Particulate Air (HEPA) filter for collecting fine dusts having a certain size. The HEPA filter may be configured with a glass fiber.

The filter body 110 may be bent to have a plurality of mountains 111 and a plurality valleys 112. In the filter body 110, the plurality of mountains 111 may be connected with the plurality of valleys 112. A plurality of surface portions 113 may be formed between the mountains 111 and the valleys 112 of the filter body 110. The plurality of mountains 111 and the plurality of valleys 112 of the filter body 110 may be formed by folding the plurality of surface portions 113 to overlap the plurality of surface portions 113.

The filter body 110 may be inserted in and supported by the frame 120. The frame 120 may be formed with a size and shape corresponding to the filter body 110. The frame 120 may be in a shape of a rectangle.

The frame 120 may include a fabric, a synthetic resin, etc. The filter frame 120 may be configured with a PET material. In an embodiment of the disclosure, an example in which the filter frame is a PET material is shown, however, the filter frame may include a ceramic material, a metal material, cordierlite configured with alumina and silica, mulite, a combination of cordierlite and mulite, or an aluminum material.

The frame 120 may include first surfaces 121 (121*a* and 121*b*) respectively forming upper and lower surfaces, and second surfaces 122 (122*a* and 122*b*) respectively forming left and right surfaces.

In the frame 120, the first surfaces 121 may be connected with the second surfaces 122.

The bending structure of the filter body 110 in which the plurality of mountains 111 and the plurality of valleys 112 are bent may be a structure having difficulties in removing dust entered the valleys 112, that is, edges between the surface portions 113.

To remove dust entered the edges of the filter body 110, the filter 100 may include the bending guide 200 provided by cutting at least one surface of the filter 100 such that the filter 100 is bendable.

The bending guide 200 may enable the filter 100 to be deformed to a curved shape. The bending guide 200 may be provided in the frame 120 of the filter 100. The bending guide 200 may be provided in the second surface 122 of the frame 120.

The first surfaces 121 and the second surfaces 122 of the frame 120 may be formed with a first thickness t1.

The bending guide 200 may include a plurality of cutting portions 210 and a plurality of bent mountains 111 formed by the plurality of cutting portions 210. The plurality of cutting portions 210 and the plurality of bent mountains 111 of the bending guide 200 may be alternately arranged. The cutting portions 210 of the bending guide 200 may have a linear shape. The cutting portions 210 of the bending guide 200 may correspond to a horizontal direction of the filter body 110. The cutting portions 210 may correspond to a horizontal direction of a plurality of bent mountains 111 and a plurality of valleys 112 of the bending guide 200.

The cutting portions 210 may be formed by cutting at least one portion of the frame 120 such that the filter 100 is bendable. The cutting portions 210 may be formed by cutting at least one portion of the second surface 122 of the frame 120.

The cutting portions 210 may be formed with a first length 11. The first length 11 of the cutting portions 210 may be shorter than the first thickness t1 of the second surface 122 of the frame 120. A difference between the first length 11 of the cutting portions 210 and the first thickness t1 of the second surface 122 may be about 1 mm to 2 mm. The cutting portions 210 may have the first length 11 obtained by subtracting 1 mm to 2 mm from the first thickness t1 of the frame 120. The first length 11 of the cutting portions 210 may extend up to a location corresponding to at least ⅓ of the thickness of the second surface 122. The first length 11 of the cutting portions 210 may be formed by cutting the second surface 122 up to a location spaced 1 mm to 2 mm from a bottom of the second surface 122 to support bending of the filter 100 from a location corresponding to ⅓ of the first thickness t1 of the second surface 122 of the frame 120.

Each of the plurality of bent mountains 111 of the bending guide 200 may be formed in a shape of a rectangle. Each of the plurality of bent mountains 111 of the bending guide 200 may be formed in a shape of a rectangle by the cutting portions 210 to prevent the filter 100 from being deformed by repetitive use. The plurality of bent mountains 111 formed in the shapes of rectangles in the bending guide 200 may improve a restoring force upon restoring from a bending state of the filter 100 to a flat state.

The number of the bent mountains 111 of the bending guide 200 may be about 20 to 90 by considering differential pressure. The cutting portions 210 of the bending guide 200 may have various lengths according to degrees of bending of the filter 100. According to an embodiment of the disclosure, an example in which the number of the bent mountains 111 is about 20 to 90 is shown. However, the concept of the disclosure is not limited to this. Also, the length of the cutting portions of the bending guide may vary depending on a degree of bending of the filter.

Figure 8:
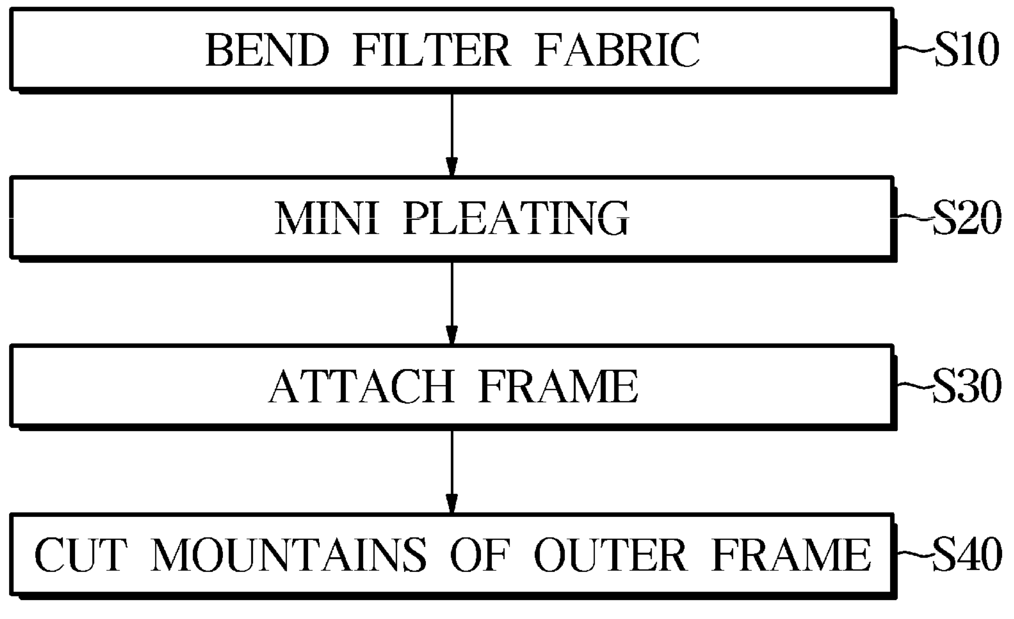
FIG. 8 shows a process of manufacturing a filter according to an embodiment of the disclosure.
Figure 9:
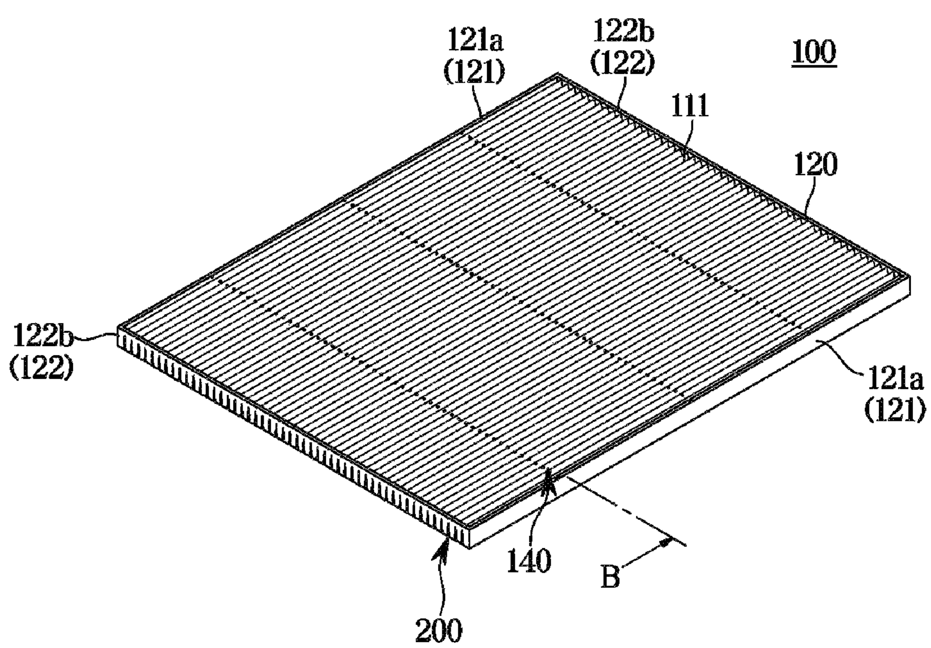
FIG. 9 is a perspective view of a filter according to an embodiment of the disclosure.
Figure 10:
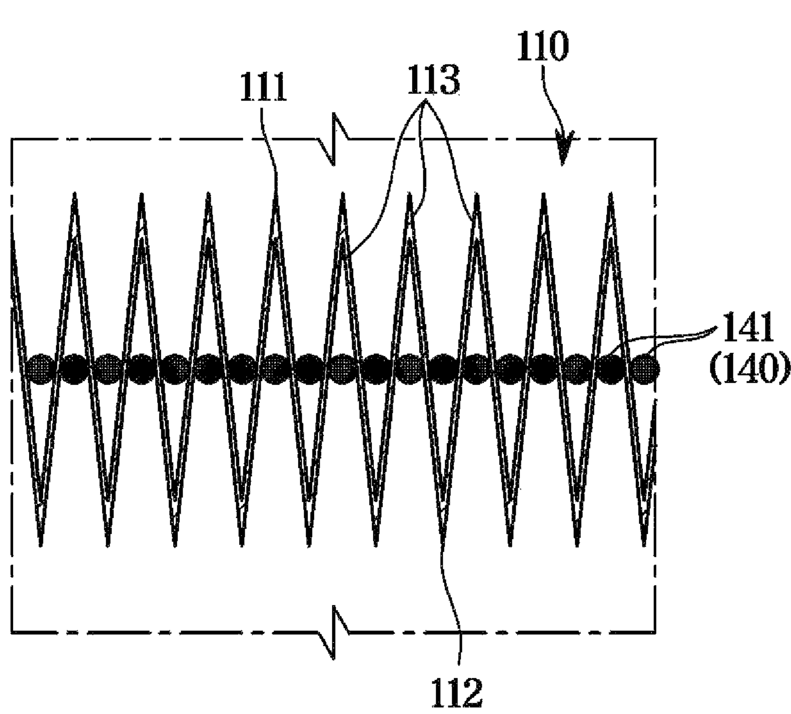
FIG. 10 is an enlarged view of an area B of FIG. 9, showing a filter including an adhesive portion according to an embodiment of the disclosure.

FIG. 8 shows a process of manufacturing a filter according to an embodiment of the disclosure, FIG. 9 is a perspective view of a filter according to an embodiment of the disclosure, and FIG. 10 is an enlarged view of an area B of FIG. 9, showing a filter including an adhesive portion according to an embodiment of the disclosure.

FIG. 8 shows a process of manufacturing a bending guide of a filter according to an embodiment of the disclosure.

As shown in FIGS. 8 to 10, a process of manufacturing the bending guide 200 of the filter 100 may be as follows.

The bending guide 200 of the filter 100 may be formed by bending a fabric of a filter (S10), performing mini pleating (S20), attaching a frame (S30), and cutting at least one surface of the filter 100 to which the frame is attached (S40).

More specifically, the fabric of the filter may be bent in a pleated form (S10). To maximize the bending of the bent filter, mini pleating may be performed (S20). At this time, a hotmelt adhesive may be applied. By applying a hotmelt adhesive in a straight line on one surface of the filter body 110, an adhesive portion 140 may be formed. The adhesive portion 140 may extend vertically on one surface of the filter body 110. The adhesive portion 140 may be applied to the plurality of mountains 111, the plurality of valleys 112, and the plurality of surface portions 113 of the filter body 110. The adhesive portion 140, which is formed in a straight line in a vertical direction of the filter body 110, may reinforce strength of the filter body 110.

The hotmelt adhesive may be used with any limitation as long as it is one or more hotmelt adhesives containing polyolefin, selected from a group consisting of ethylene-vinyl acetate, ethylene methyl methacrylate, and ethylene ethyl acrylate. After the hotmelt adhesive is completely applied, the frame 120 may be attached to the filter body 110 to form the filter (S30).

The bending guide 200 may be formed by cutting the second surface 122 of the filter body 110 to which the frame 120 is attached. The bending guide 200 may enable the filter 200 to be deformed to a curved shape.

As shown in FIGS. 8 and 9, the adhesive portion 140 of the filter 100 may be positioned on the filter body 110 to complement an operation of the bending guide 200 for enabling the filter 100 to be bent in a curved shape.

The adhesive portion 140 may be formed by a process of spotting a hotmelt adhesive. The adhesive portion 140 may be applied in a form of spots onto the plurality of surface portions 113 of the filter body 110. The adhesive portion 140 may be formed by a hotmelt adhesive that is applied in a form of spots onto the plurality of surface portions 113 of the filter body 110. The adhesive portion 140 may reinforce the strength of the filter body 110 and enable the filter 110 to be smoothly bent by the hotmelt adhesive applied to correspond to the plurality of surface portions 113.

Because the method of manufacturing the filter 100 that is bendable by the bending guide 200 provides an effect of bending the filter by adding only the cutting operation S40 to an existing method of manufacturing a filter, low cost and a simple structure may be implemented.

Figure 11:
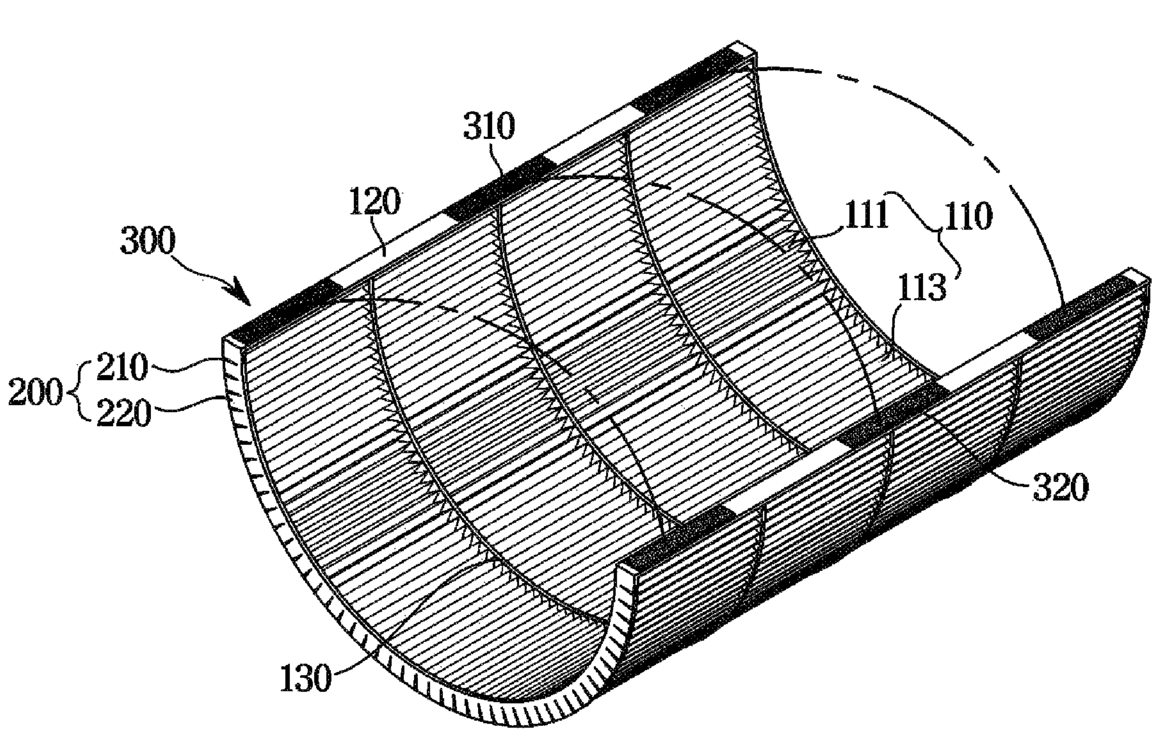
FIG. 11 shows a filter being in a bending state, according to another embodiment of the disclosure.

FIG. 11 shows a filter being in a bending state, according to another embodiment of the disclosure.

As shown in FIG. 11, the filter 100 may include a bending maintaining member 300 for maintaining a bending state of the filter 100.

The bending maintaining member 300 may include Velcro members 310 and 320. The bending maintaining members 310 and 320 may be provided on the filter frame 120 of the filter 100. The bending maintaining members 310 and 320 may be positioned on the filter frame 120 in such a way as to face each other to form the filter 100 in a cylinder shape. The Velcro members 310 and 320 may include a first Velcro 310 and a second Velcro 320. The first Velcro 310 may be positioned at one side of the filter frame 120, and the second Velcro 320 may be positioned on the other side of the filter frame 120. The first Velcro 310 and the second Velcro 320 may be positioned on the filter frame 120 in such a way as to face each other to form the filter 100 in a cylinder shape.

Each of the Velcro members 310 and 320 may be in a shape of a rectangle. According to an embodiment of the disclosure, an example in which each of the Velcro members 310 and 320 is in a shape of a rectangle corresponding to the filter frame is shown. However, a concept of the disclosure is not limited to this. For example, the shape of each Velcro may include a circle shape or an oval shape.

The bending maintaining member 300 may maintain intervals between the plurality of cutting portions 210 and the plurality of bent mountains 111 of the bending guide 200 in a bending state of the filter 100.

According to an embodiment of the disclosure, an example in which three bending maintaining members are positioned at each of both sides of the filter frame is shown. However, a concept of the disclosure is not limited to this. For example, the number of the bending maintaining members may vary according to a size and shape of the filter.

The bending maintaining member 300 may include at least one of a double-sided tape, a buckle, a band, a wire, or a hinge to maintain the bending state of the filter 100. Because the filter 100 is stably maintained in the bending state by the bending maintaining member 300, efficient cleaning may be possible.

According to an embodiment of the disclosure, an example in which the bending maintaining member 300 is a rectangular Velcro is shown. However, a concept of the disclosure is not limited to this. For example, the bending maintaining member 300 may include various structures capable of forming the filter in a cylinder shape to wash the filter in a bending state.

Figure 12:
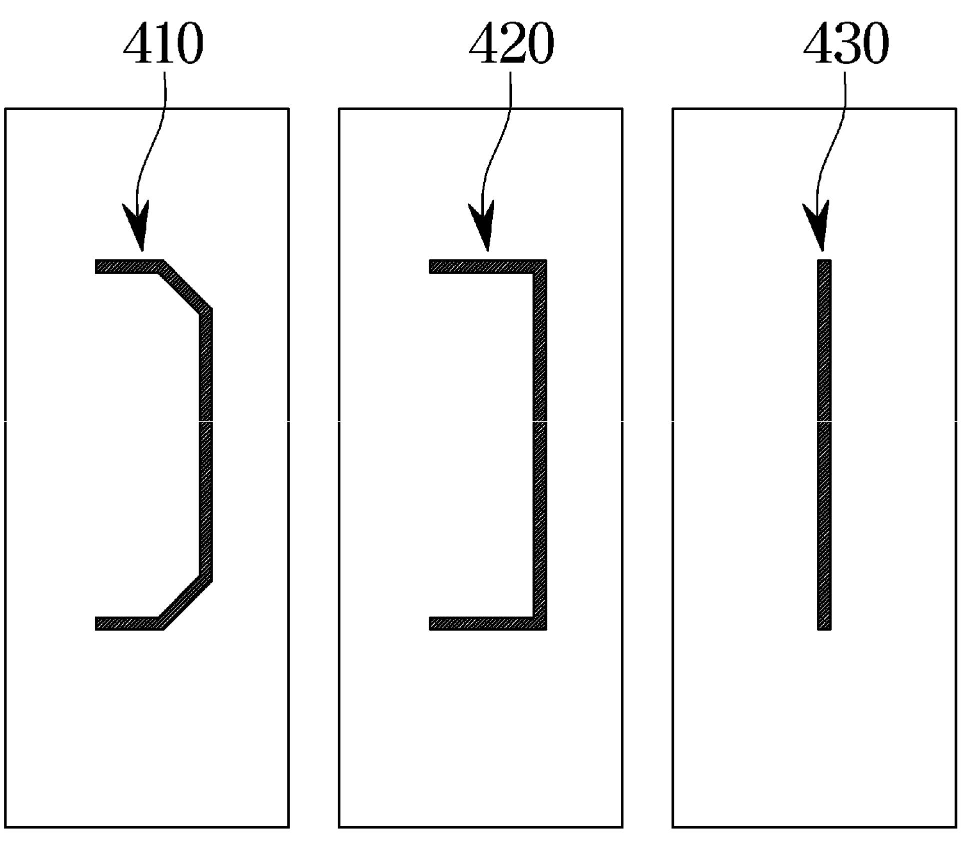
FIG. 12 shows bending maintaining members according to other embodiments of the disclosure.

FIG. 12 shows bending maintaining members according to other embodiments of the disclosure.

As shown in FIG. 12, the bending maintaining member 300 may further include a buckle 410, 420, or 430 for connecting both ends of the filter frame 120 with each other. The buckle 410, 420, or 430 may include a polygon type 410, a quadrangle type 420, or a straight type 430.

The bending maintaining member 300 may maintain a bending state of the filter 100. By maintaining the bending state of the filter 100, efficient cleaning may be possible.

FIG. 13 is a table showing pressure loss corresponding to before and after washing of a filter (Flat) provided in a garment care apparatus according to an existing technique, and pressure loss corresponding to before and after washing of a filter (Bending) provided in a garment care apparatus according to an embodiment of the disclosure.

A bendable filter may be provided in an air cleaner as well as a garment care apparatus. That is, FIG. 13 shows pressure loss corresponding to before and after air washing and before and after water washing of filters respectively provided in a garment care apparatus and an air cleaner.

It may be seen from FIG. 13 that a bending type of a filter has smaller pressure loss than a flat type of a filter after washing, and pressure loss after air washing is smaller than pressure loss after water washing.

Figure 14B:
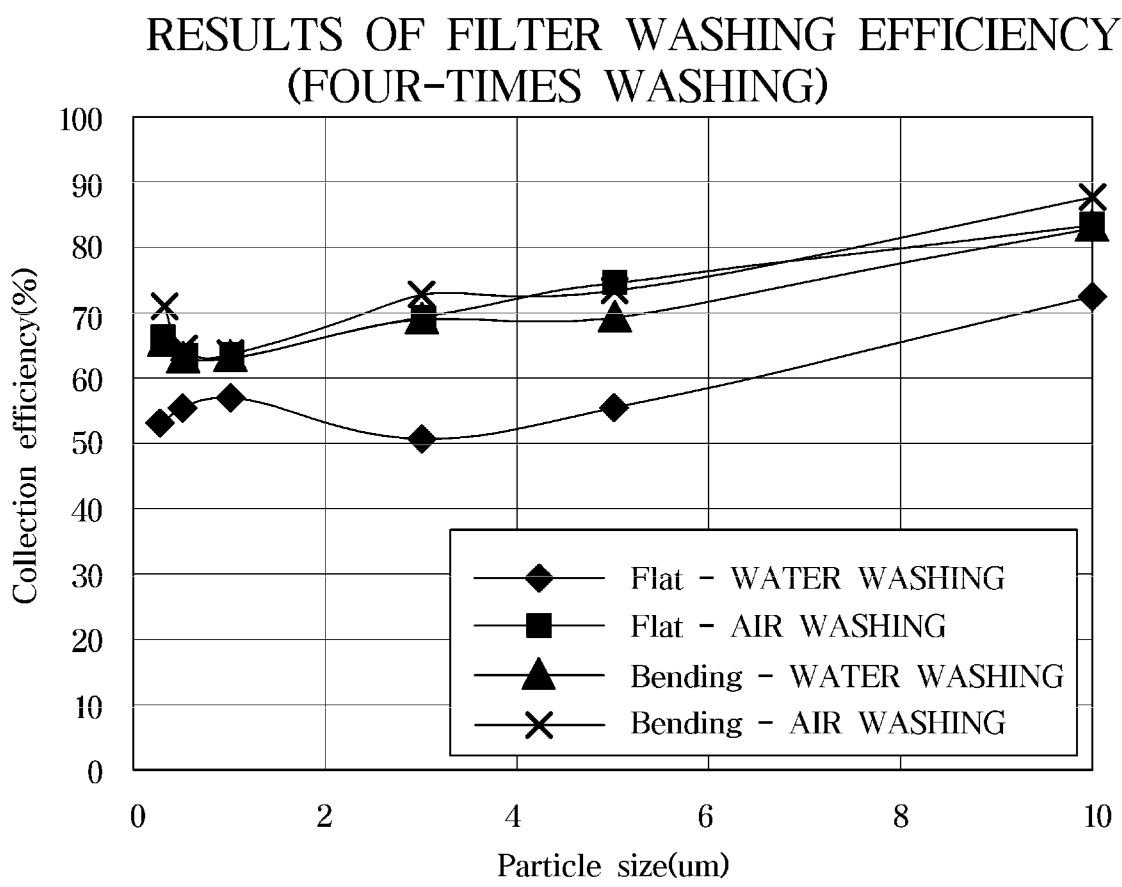
FIG. 14B is a graph corresponding to the table of FIG. 14A.

FIG. 14A is a table showing filter performance after a filter (Flat type) provided in a garment care apparatus according to an existing technique is washed four times with water and air, and filter performance after a filter (Bending type) provided in a garment care apparatus according to an embodiment of the disclosure is washed four times with water and air, and FIG. 14B is a graph corresponding to the table of FIG. 14A.

It may be seen from FIGS. 14A and 14B that a bending type of a filter has more effective performance than a flat type of a filter.

Figure 15:
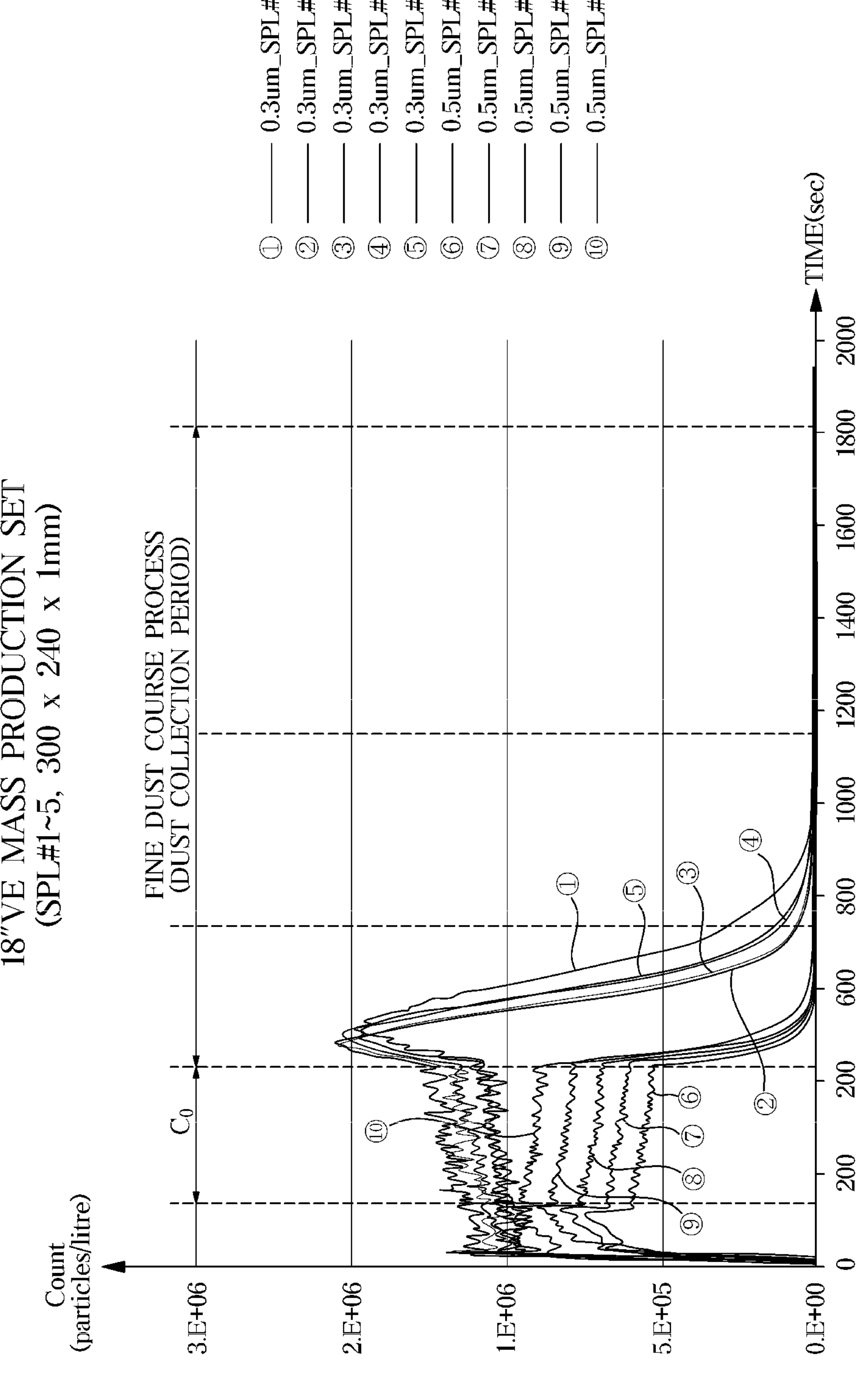
FIG. 15 is a graph showing filter performance after a filter (Bending type) provided in a garment care apparatus according to an embodiment of the disclosure is washed four times with water.

FIG. 15 is a graph showing filter performance after a filter (Bending type) provided in a garment care apparatus according to an embodiment of the disclosure is washed four times with water.

It may be seen from FIG. 15 that after a bending type of a filter is washed four times with water, 90% or more of floating fine dust is removed.

So far, specific embodiments have been shown and described. However, the disclosure is not limited to the above-described embodiments, and various modifications can be made by those skilled in the art without departing from the gist of the technical idea of the disclosure defined by the claims below.

Figure 16:
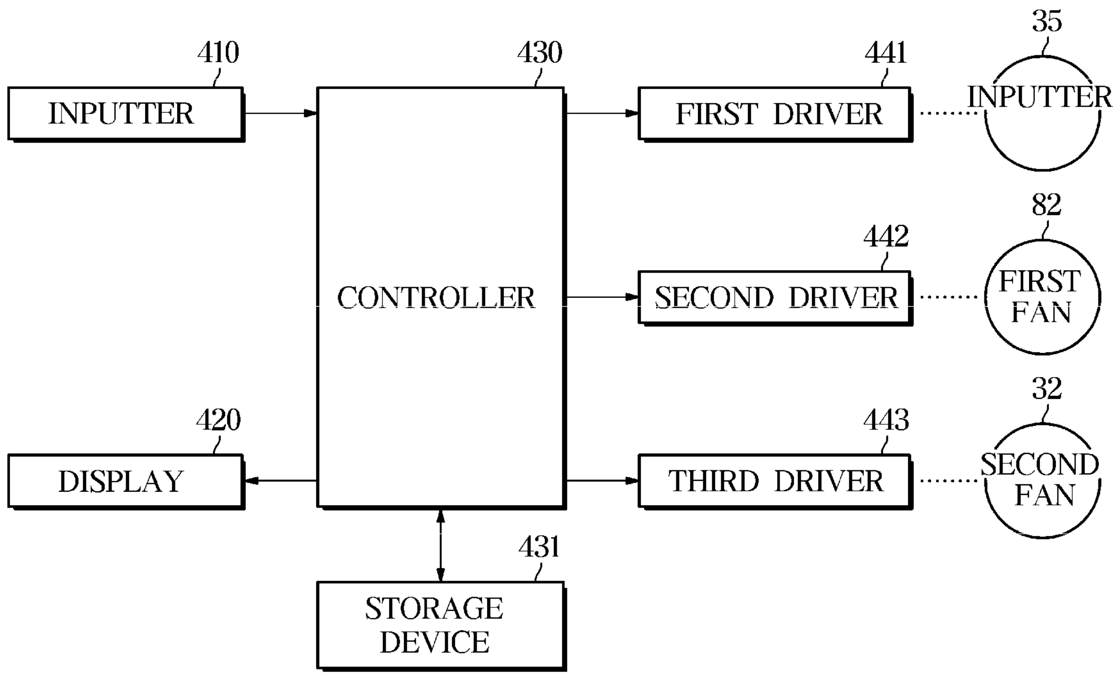
FIG. 16 shows a control configuration of a garment care apparatus according to an embodiment of the disclosure.

FIG. 16 shows a control configuration of a garment care apparatus according to an embodiment of the disclosure.

The garment care apparatus may include an inputter 410, a display 420, a controller 430, a storage device 431, and a plurality of drivers 441, 442, and 443.

The inputter 410 may be provided on a door, and include a hardware device, such as various buttons or switches, a pedal, a keyboard, a mouse, a track-ball, various levers, a handle, or a stick.

Also, the inputter 410 may include a Graphical User Interface (GUI), that is, a software device, such as a touch pad for receiving a user's input. The touch pad may be implemented as a Touch Screen Panel (TSP), and constitute an interlayer structure with the display 420.

The inputter 410 may receive a user command.

The inputter 410 may receive a filter drying command as the user command.

The filter drying command may be a command selected by a user (consumer) after a washed filter is installed in the filter installing portion 17 by the user, and may be a command for drying a filter wet with water.

The inputter 410 may receive a filter washing guide command for guiding washing of the filter.

The inputter 410 may receive information about a management course of the garment care apparatus 1. For example, the management course may include a standard course, a sterilization course, a fine dust removal course, a rapid course, etc.

The display 420 may be provided as a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECO) panel, a Light Emitting Diode (LED) panel, or an Organic Light Emitting Diode (OLED) panel, although not limited thereto.

The display 420 may be provided on the door 20.

The display 420 may display an operation state of the garment care apparatus, or may output an image for guiding a control of the garment care apparatus, an image for guiding washing and drying of the filter, etc.

The display 420 may display information about a washing time of the filter.

The controller 430 may process a received user input, and control an operation of the garment care apparatus 1 in correspondence to the received user input.

Upon reception of a filter washing guide command through the inputter 410, the controller 430 may control an operation of the display 420 to output filter washing guide information.

For example, the filter washing guide information may include a method for separating the filter from the garment care room, a method for washing the filter with water, a water washing time of the filter, a method for installing the filter in the filter installing portion 17, a method for installing the filter cover in the filter installing portion 17, a method for inputting a filter drying command, etc.

The filter washing guide information may include a method for washing the filter with air, and guide information indicating that the filter needs not to be dried upon air washing of the filter.

The controller 430 may control, upon reception of a filter drying command through the inputter 410, an operation of the first motor provided in the first fan 82 to operate the first fan 82 being adjacent to the filter 100.

The controller 430 may operate the first fan for a first preset time. The first preset time may be a time between about 60 minutes and about 90 minutes.

The controller 430 may control, upon reception of a filter drying command through the inputter 410, operations of the first and second motors provided in the first and second fans 82 and 32 to operate the first and second fans 82 and 32.

The controller 430 may operate the first and second fans 82 and 32 for a second preset time. The second preset time may be equal to or shorter than the first preset time.

The controller 430 may control, upon reception of a filter drying command through the inputter 410, operations of the compressor 35 and the second motor provided in the second fan 32 to operate the compressor 35 and the second fan 32.

The controller 430 may control, upon reception of a filter drying command through the inputter 410, operations of the compressor 35 and the first motor provided in the first fan 82 to operate the compressor 35 and the first fan 82.

That is, the controller 430 may control an operation of at least one of the first fan 82 or the second fan 32 such that air flows in the garment care room, the machine room, and the second ducts 91 and 92.

The controller 430 may control, upon reception of a filter drying command through the inputter 410, operations of the first and second motors provided in the first and second fans 82 and 32 to operate the compressor 35 and the first and second fans 82 and 32.

More specifically, the controller 430 may control an operation of the second fan 32, and then control an operation of the compressor 35 upon elapse of a first reference time, and according to elapse of a second reference time, the controller 430 may control an operation of the first fan 82.

The first reference time and the second reference time may be times elapsed from a time at which a filter drying command is received. For example, the first reference time may be 3 minutes elapsed from a time at which a filter drying command is received, and the second reference time may be 13 minutes elapsed from a time at which a filter drying command is received.

In this case, heat exchange may occur between inside air of the garment care room 11 and inside air of the machine room by operations of the compressor and the second fan, and the inside air of the garment care room and the machine room may circulate by operations of the first and second fans, thereby removing water from the filter 100. The water removed from the filter 100 may move along air circulating from the garment care room 11 to the machine room 13 and then be dehumidified by heat exchange of air inside the machine room.

The controller 430 may control, upon a control of the first fan, the motor of the first fan to rotate the first fan at a rpm that is equal to or higher than a reference rpm being a rpm of the first fan in the standard course of the garment care apparatus, wherein the reference rpm may be about 2000 rpm.

The controller 430 may control, upon a control of the first fan, the first motor of the first fan to generate an air volume that is equal to or greater than a reference air volume, wherein the reference air volume may be about 5 CMM.

Upon elapse of a preset drying time from a time at which the first fan starts operating, the controller 430 may stop the compressor and the first and second fans, thereby finishing a filter drying process. For example, the preset drying time may be a time obtained by an experiment, and may be about 40 minutes.

The controller 430 may obtain information about a washing time of the filter, and control the display to display the information about the washing time of the filter.

To obtain information about a washing time of the filter, the controller 430 may count an operation time of the compressor during an operation of the compressor, sum the counted operation time of the compressor and a stored operation time of the compressor, and cumulatively store the sum. In this case, information about a washing time of the filter may be obtained by the cumulative operation time of the compressor.

The controller 430 may obtain information about a washing time of the filter based on a cumulative operation time of the first fan or the second fan.

The controller 430 may count a time elapsed from a time at which a filter drying command is received to obtain an elapsed time for washing of the filter, and obtain information about a washing time of the filter based on the obtained, elapsed time for washing of the filter.

The garment care apparatus may further include a dust amount detector for detecting a dust amount of the filter. In this case, the controller 430 may obtain information about a washing time of the filter based on a dust amount detected by the dust amount detector.

The controller 430 may include a memory for memorizing and/or storing programs, instructions, and data for controlling operations of the garment care apparatus, and include a processor that generates control signals for controlling operations of the garment care apparatus based on the programs, instructions, and data memorized and/or stored in the memory.

The processor and memory may be implemented as separate chips or a single chip. Also, the controller 430 may include a plurality of processors and a plurality of memories.

The processor may include a logic circuit and an arithmetic circuit, as hardware. The processor may process data according to a program and/or instruction provided from the memory, and generate a control signal according to a result of the processing. For example, in a case in which a user inputs a command for selecting a management course by controlling the inputter, the garment care apparatus may perform garment management corresponding to the selected management course.

The memory may include a volatile memory, such as Static Random Access Memory (S-RAM) and Dynamic Random Access Memory (D-RAM), for temporarily storing data, and a non-volatile memory, such as Read Only Memory (ROM), Erasable Programmable Read Only Memory (EPROM) and Electrically Erasable Programmable Read Only Memory (EEPROM), for storing data for a long time.

The storage device 431 may store filter washing guide information.

The storage device 431 may store information about a washing time of the filter.

The storage device 431 may store at least one of a reference dust amount, a reference use time of the filter, or a reference driving time of the compressor to set a washing time of the filter.

The storage device 431 may be implemented as at least one among a non-volatile memory device, such as a cache, ROM, PROM, EPROM, EEPROM, and flash memory, a volatile memory device such as RAM, or a storage medium, such as a Hard Disk Drive (HDD) and CD-ROM, although not limited thereto. The storage device 431 may be a memory implemented as a separate chip from the processor described above in regard of the controller 430, or the storage device 431 and the processor may be implemented as a single chip.

The garment care apparatus may include a first driver 441 for driving the compressor 35 in correspondence to a control command from the controller 430, a second driver 442 for driving the first motor of the first fan 82 in correspondence to a control command from the controller 430, and a third driver 443 for driving the second motor of the second fan 32 in correspondence to a control command from the controller 430.

The first driver 441 may include an inverter for adjusting a rpm of the motor in the compressor, the second driver 442 may include an inverter for adjusting a rpm of the first motor of the first fan, and the third driver 443 may include an inverter for adjusting a rpm of the second motor of the second fan.

At least one component may be added or omitted to correspond to performance of the components of the garment care apparatus shown in FIG. 16. Also, it will be easily understood by one of ordinary skill in the art that relative positions of the components may change to correspond to the performance or structure of the system.

Meanwhile, the components shown in FIG. 16 may be software components and/or hardware components, such as a Field Programmable Gate Array (FPGA) and an Application Specific Integrated Circuit (ASIC).

Figure 17:
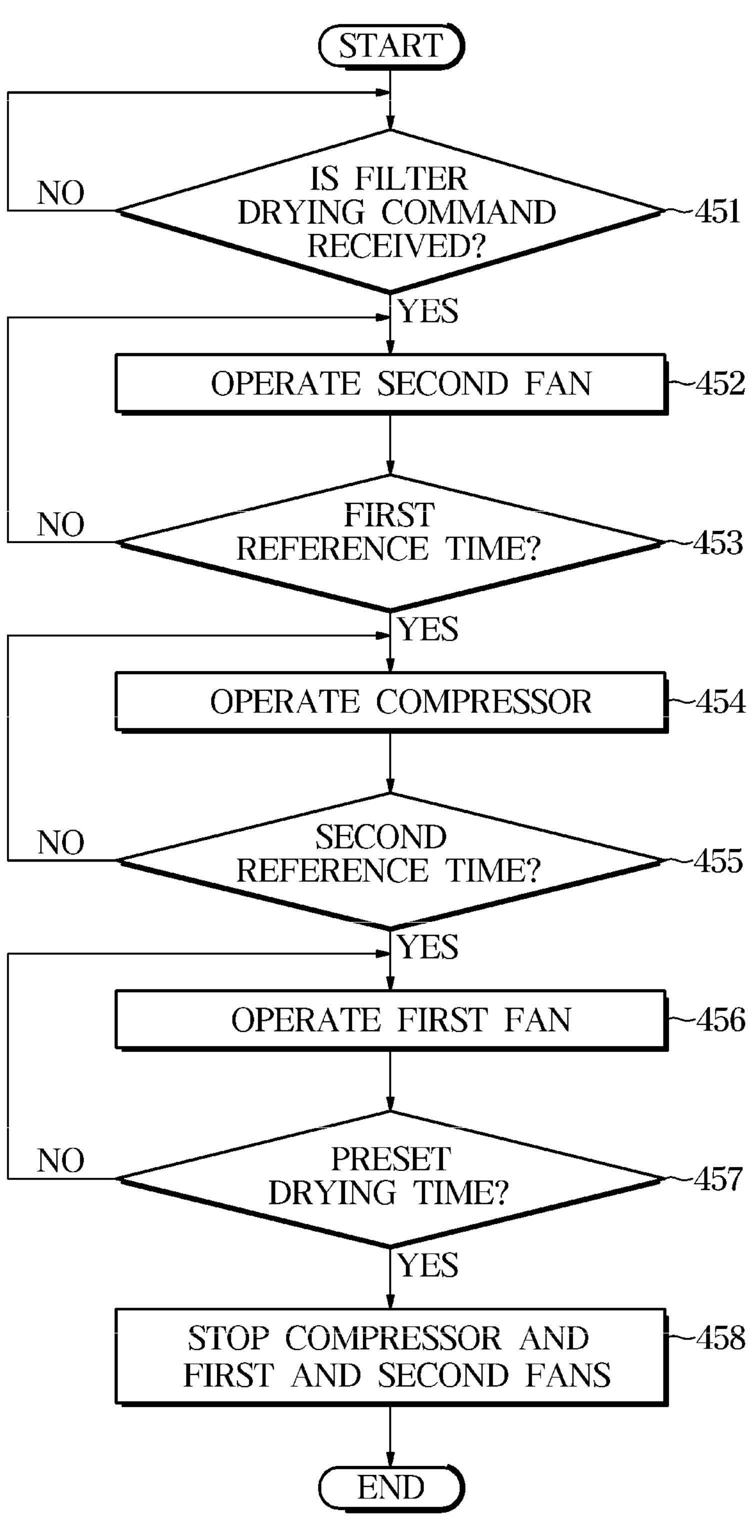
FIG. 17 is a control flowchart of a garment care apparatus according to an embodiment of the disclosure.

FIG. 17 is a control flowchart of a garment care apparatus according to an embodiment of the disclosure.

The garment care apparatus may identify, upon reception (451) of a filter drying command through the inputter 410, that a wet filter washed with water is installed, and perform a drying operation for drying the filter.

First, the garment care apparatus may operate the second fan (452).

The second fan 32 may be provided on the first duct 31 to suck air of the garment care room 11 into the first duct 31. Air of the garment care room 11 may enter the first circulation flow path 39 through the first air current inlet 11*a*. The air may pass through the heat exchanger 30.

The garment care apparatus may count a time elapsed from a time at which the filter drying command is received, and operate the compressor according to an identification (453) that the counted time is a first reference time (454).

Also, the first reference time may be counted from a time at which the second fan starts operating, instead of the time at which the filter drying command is received.

At this time, a refrigerant compressed by and discharged from the compressor may pass through the condenser and the evaporator and then be again sucked into the compressor.

The refrigerant evaporated in the evaporator 33 may absorb latent heat of surrounding air and condense water in the air to thereby remove the water. Also, in a case in which a refrigerant passed through the compressor 35 is condensed in the condenser 34, the refrigerant may emit latent heat toward surrounding air to heat the surrounding air. That is, the evaporator 33 and the condenser 34 may function as a heat exchanger, and air entered the machine room 13 by the second fan 32 may pass through the evaporator 33 and the condenser 34 sequentially to be dehumidified and heated.

The dehumidified and heated air may be again discharged to the garment care room 11 through the first air current outlet 11*b*.

According to an identification (455) that the counted time is a second reference time (455), the garment care apparatus may operate the first fan 82 (456).

A rpm of the first fan 82 may be equal to or higher than about 2000 rpm that is a reference rpm in the standard course. The rpm of the first fan 82 may be a rpm that generates an air volume of about 5 CMM or more.

The dehumidified and heated air existing inside the garment care room 11 may be sucked into the second air current inlet 12*a* by the operation of the first fan, and the sucked air may pass through the filter. At this time, hot and dry air passing through the filter may pass through the filter together with water of the filter. That is, humidity of air passed through the filter and flowing along the second duct may be higher than humidity of air before passing through the filter.

As such, the dehumidified and heated air of the garment care room 11 may enter the second duct 91 by passing through the filter 100 of the second air current inlet 12*a*. The air entering the second duct 91 may remove water from the filter 100. Water of the filter 100 may be removed by the air entering the second duct 91. The water may be included in air and move to the machine room. The air moved to the machine room may be dehumidified by the heat exchanger.

The garment care apparatus may count a time elapsed from a time at which the first fan 82 starts operating, and according to an identification (457) that the counted time is a preset drying time, the garment care apparatus may stop the compressor, the first fan, and the second fan (458), thereby finishing the filter drying operation.

The garment care apparatus may output a guide sound notifying filter drying completion through a speaker (not shown).

Figure 18:
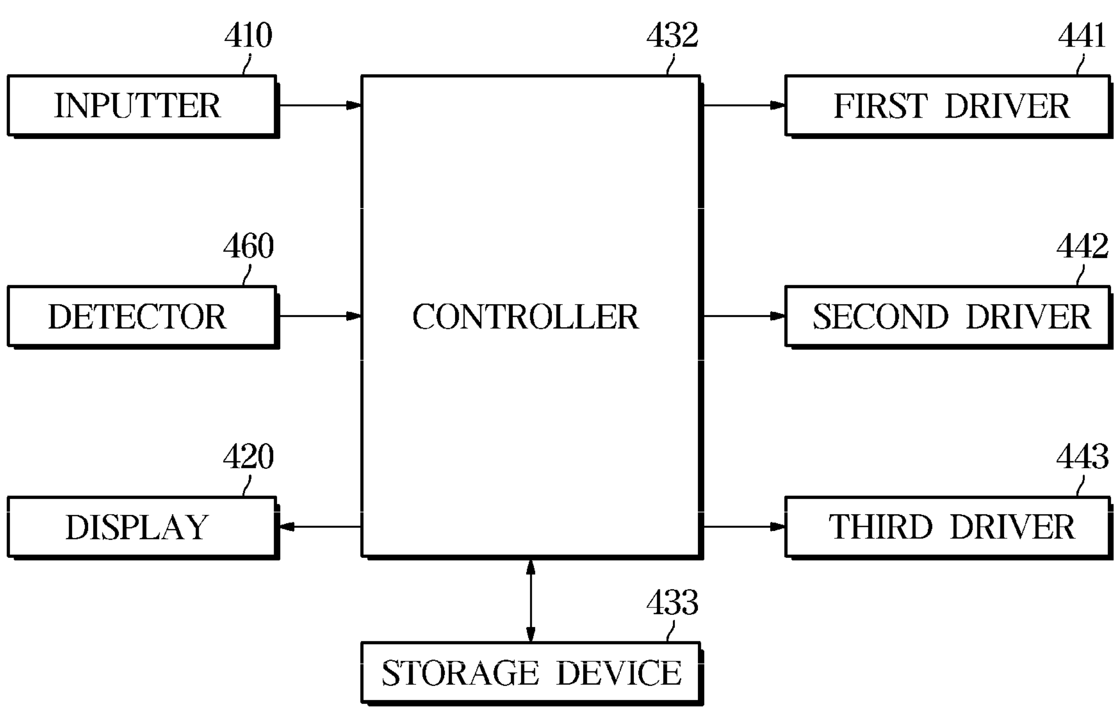
FIG. 18 shows a control configuration of a garment care apparatus according to another embodiment of the disclosure.

FIG. 18 shows a control configuration of a garment care apparatus according to another embodiment of the disclosure.

A garment care apparatus according to another embodiment of the disclosure may include an inputter 410, a display 420, a controller 432, a storage device 433, and a plurality of drivers 441, 442, and 443, and further include a detector 460.

The inputter 410, the display 420, and the plurality of drivers 441, 442, and 443 provided in the garment care apparatus according to another embodiment may be the same as the inputter 410, the display 420, and the plurality of drivers 441, 442, and 443 provided in the garment care apparatus according to an embodiment, and accordingly, descriptions thereof will be omitted.

Also, a button for receiving a filter drying command, provided in the inputter 410 of the garment care apparatus according to another embodiment, may be omitted.

The display 420 may display information about a drying progress of the filter. For example, the display 420 may display a degree of a drying progress of the filter, and display a dryness of the filter.

The detector 460 may include a humidity detector for detecting ambient humidity of the second ducts 91 and 92 or the filter 100.

The controller 432 may control, upon reception of a filter drying command through the inputter 410, an operation of the humidity detector to detect ambient humidity of the filter.

The controller 432 may control, upon reception of a filter drying command through the inputter 410, an operation of at least one of the first fan 82 or the second fan 32.

The controller 432 may control, upon reception of a filter drying command through the inputter 410, an operation of at least one of the compressor 35, the first fan 82, or the second fan 32.

At this time, the controller 432 may cause the heat exchanger 30 to perform dehumidification by controlling an operation of the compressor.

The controller 432 may control, upon reception of a filter drying command through the inputter 410, an operation of the second fan 32, and according to elapse of a first reference time, the controller 432 may control an operation of the compressor 35, and control an operation of the second fan 32 according to elapse of a second reference time, thereby performing a filter drying operation (or referred to as a filter drying process).

The first reference time and the second reference time may be times elapsed from a time at which a filter drying command is received. For example, the first reference time may be 3 minutes elapsed from a time at which a filter drying command is received, and the second reference time may be 13 minutes elapsed from a time at which a filter drying command is received.

The controller 430 may control, upon a control of the first fan 82, the motor of the first fan to rotate the first fan at a rpm that is higher than or equal to a reference rpm being a rpm of the first fan in a standard course of the garment care apparatus, wherein the reference rpm may be about 2000 rpm.

The controller 430 may control, upon a control of the first fan 82, the first motor of the first fan to generate an air volume that is greater than or equal to a reference air volume, wherein the reference air volume may be about 5 CMM.

The controller 432 may monitor a dried state of the filter based on humidity information detected by the humidity detector during the filter drying process, and stop the filter drying process based on a result of the monitoring.

For example, the controller 432 may stop operations of the compressor 35 and the first and second fans 82 and 32 according to an identification that a dryness corresponding to a dried state of the filter is greater than or equal to a reference dryness.

The controller 432 may control rpms of the first and second fans 82 and 32, or control at least one of a frequency, a current, or a voltage of the compressor 35, based on a dryness of the filter 100 during the filter drying process. For example, the controller 432 may control the first and second motors of the first and second fans 82 and 32 such that the rpms of the first and second fans 82 and 32 are reduced as a dryness of the filter 100 increases, during the filter drying process.

The controller 432 may obtain ambient humidity of the filter based on humidity information detected by the humidity detector, and according to an identification that the obtained humidity is lower than or equal to reference humidity, the controller 432 may stop operations of the compressor 35 and the first and second fans 82 and 32.

The ambient humidity of the filter may be an amount or ratio of water contained in surrounding air of the filter, or may be an amount or ratio of water contained in air flowing along the second duct.

In this case, the controller 432 may control rpms of the first and second fans 82 and 32, or control at least one of a frequency, a current or a voltage of the compressor 35, based on humidity or a reduction ratio of humidity. For example, the controller 432 may control the first and second motors such that the rpms of the first and second motors of the first and second fans 82 and 32 are reduced as a reduction ratio of humidity of the filter increases, during the filter drying process.

During a control of the filter drying process, the controller 432 may cause inside air of the garment care room to pass through the heat exchanger via the lower space of the garment care room and the first duct 31 and then move to the inside of the garment care room by controlling an operation of the second fan 32, and the controller 432 may cause inside air of the garment care room to pass through the filter 100 and then move to the second ducts 91 and 92 and the upper space of the garment care room by controlling an operation of the first fan 82.

The detector 460 may further include a separation detector for detecting state information about an installation state and a separation state of the filter. In this case, the controller 432 may identify an installation/separation state of the filter based on detection information from the separation detector, and according to an identification that the filter has changed from a separation state to an installation state, the controller 432 may detect ambient humidity of the filter by controlling an operation of the humidity detector.

According to an identification that ambient humidity of the filter, detected upon a start of an operation of the humidity detector, is lower than or equal to reference humidity, the controller 432 may identify that the filter installed in the filter installing portion is a new filter or a filter washed with air. Accordingly, in the case in which ambient humidity of the filter, detected upon a start of an operation of the humidity detector, is lower than or equal to the reference humidity, the controller 432 may perform no filter drying process.

The controller 432 may obtain a dryness of the filter based on humidity information detected by the humidity detector while performing a filter drying process, and control the display 420 to display information about a degree of a drying progress corresponding to the obtained dryness of the filter. The controller 432 may also display information about a remaining time of the filter drying process, corresponding to the dryness of the filter.

The controller 432 may obtain information about a washing time of the filter, and control the display to display the information about the washing time of the filter.

The detector 460 may further include a dust amount detector for detecting a dust amount of the filter. In this case, the controller 432 may obtain information about a washing time of the filter based on a dust amount detected by the dust amount detector.

The controller 432 may include a memory for memorizing and/or storing programs, instructions, and data for controlling operations of the garment care apparatus, and include a processor that generates control signals for controlling operations of the garment care apparatus based on the programs, instructions, and data memorized and/or stored in the memory.

The storage device 433 may store filter washing guide information.

The storage device 433 may store information about a washing time of the filter.

The storage device 433 may store at least one of a reference dust amount, a reference use time of the filter, or a reference driving time of the compressor to set a washing time of the filter.

The storage device 433 may store information about a reference dryness or reference humidity.

The storage device 433 may store information about driving times of the first and second fans and a driving time of the compressor. That is, the storage device 433 may store information about the first and second reference times.

The storage device 433 may be implemented as at least one among a non-volatile memory device, such as a cache, ROM, PROM, EPROM, EEPROM, and flash memory, a volatile memory device such as RAM, or a storage medium, such as a HDD and CD-ROM, although not limited thereto. The storage device 433 may be a memory implemented as a separate chip from the processor described above in regard of the controller 430, or the storage device 433 and the processor may be implemented as a single chip.

At least one component may be added or omitted to correspond to performance of the components of the garment care apparatus shown in FIG. 18. Also, it will be easily understood by one of ordinary skill in the art that relative positions of the components may change to correspond to the performance or structure of the system.

Meanwhile, the components shown in FIG. 18 may be software and/or hardware components, such as a FPGA and an ASIC.

Figure 19:
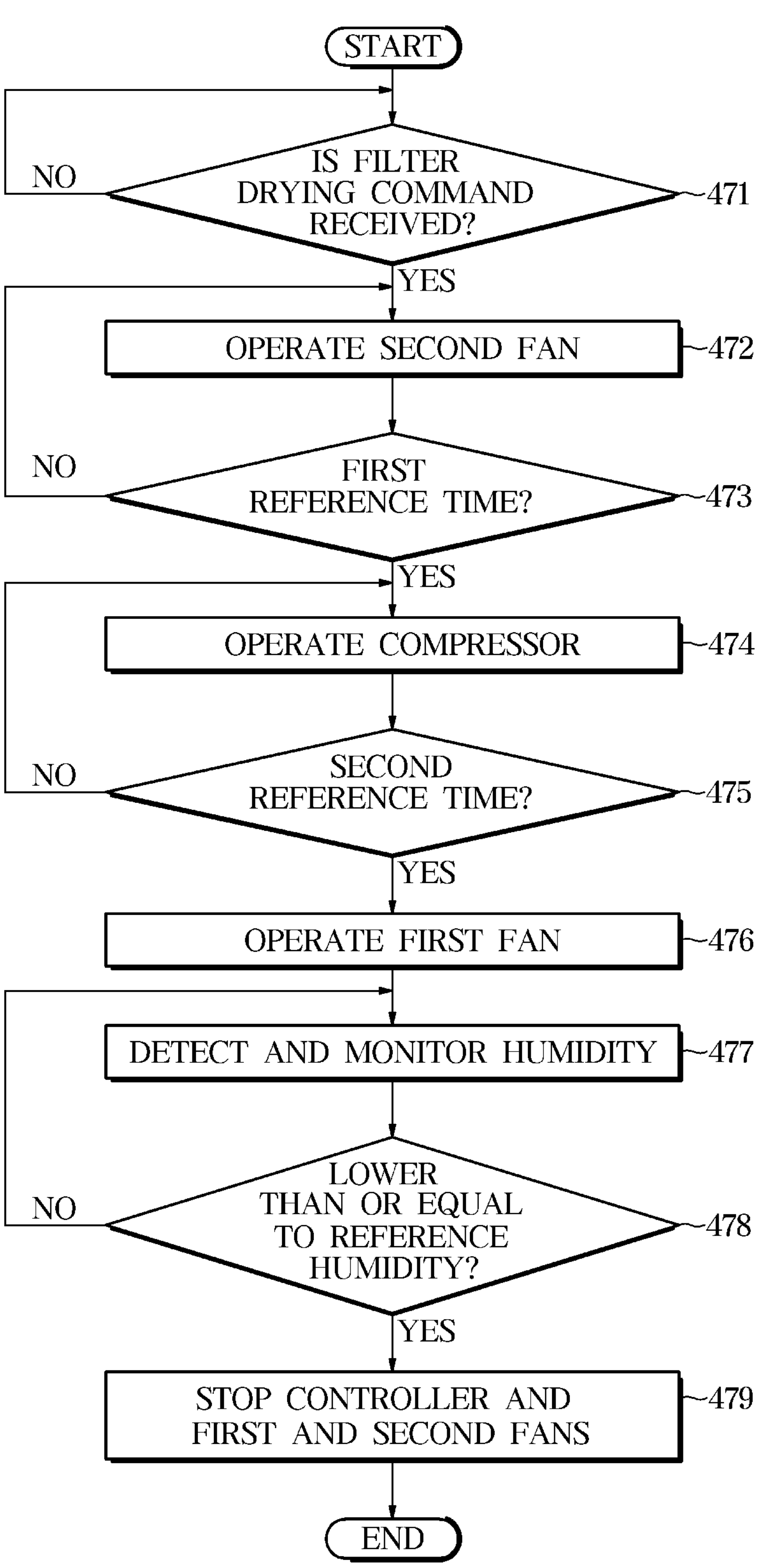
FIG. 19 is a control flowchart of a garment care apparatus according to another embodiment of the disclosure.

FIG. 19 is a control flowchart of a garment care apparatus according to another embodiment of the disclosure.

The garment care apparatus may identify, upon reception (471) of a filter drying command through the inputter 410, that a wet filter washed with water is installed, and perform a drying operation for drying the filter.

In addition, the garment care apparatus may identify whether the filter has changed from a separation state to an installation state based on installation/separation information detected by the separation detector, and according to an identification that the filter has changed from the separation state to the installation state, the garment care apparatus may start a drying operation, and start a detection operation by the humidity detector.

First, the garment care apparatus may operate the second fan 32 (472).

The second fan 32 may be provided on the first duct 31 to suck air of the garment care room 11 into the first duct 31. Air of the garment care room 11 may enter the first circulation flow path 39 through the first air current inlet 11*a*. The air may pass through the heat exchanger 30.

The garment care apparatus may count a time elapsed from a time at which a filter drying command is received, and according to an identification (473) that the counted time is a first reference time, the garment care apparatus may operate the compressor (474).

Also, the garment care apparatus may count the first reference time from a time at which the second fan starts operating, instead of the time at which the filter drying command is received.

A refrigerant compressed by and discharged from the compressor 35 may pass through the condenser 34 and the evaporator 33 and then be sucked into the compressor.

The refrigerant evaporated in the evaporator 33 may absorb latent heat of surrounding air and condense water in the air to thereby remove the water. Also, in a case in which a refrigerant passed through the compressor 35 is condensed in the condenser 34, the refrigerant may emit latent heat toward surrounding air to heat the surrounding air. That is, the evaporator 33 and the condenser 34 may function as a heat exchanger, and air entered the machine room 13 by the second fan 32 may pass through the evaporator 33 and the condenser 34 sequentially to be dehumidified and heated. Then, the dehumidified and heated air may be again discharged to the garment care room 11 through the first air current outlet 11*b*.

According to an identification (475) that the counted time is a second reference time, the garment care apparatus may operate the first fan 82 (476).

A rpm of the first fan 82 may be equal to or higher than about 2000 rpm that is a reference rpm in the standard course. The rpm of the first fan 82 may be a rpm that generates an air volume of about 5 CMM or more.

The dehumidified and heated air (that is, hot and dry air) existing inside the garment care room 11 may be sucked through the second air current inlet 12*a* by the operation of the first fan 82, and the sucked air may pass through the filter 100.

At this time, the dehumidified and heated air of the garment care room 11 may enter the second duct 91 by passing through the filter 100 of the second air current inlet 12*a*. The air entering the second duct 91 may remove water from the filter 100. Water of the filter 100 may be removed by the air entering the second duct 91, and the water may be included in air and move to the machine room. The air moved to the machine room may be dehumidified by the heat exchanger.

The water in the air may be condensed by passing through the evaporator, and the condensed water may be stored in the drain tank via a preset flow path.

Also, air of which humidity is lowered by passing through the evaporator may be heated by passing through the condenser. The air passed through the evaporator and the condenser may be at high temperature and low humidity. The hot and dry air may enter the garment care room and the second duct.

The garment care apparatus may dry the filter through the process.

The garment care apparatus may detect ambient humidity of the filter by using the humidity detector during the filter drying process. Also, the garment care apparatus may monitor a dried state of the filter based on humidity information detected by the humidity detector (477), and stop the filter drying process based on a result of the monitoring.

For example, the garment care apparatus may obtain a dryness corresponding to a dried state of the filter based on detected humidity information, and according to an identification that the obtained dryness is greater than or equal to a reference dryness, the garment care apparatus may stop operations of the compressor 35 and the first and second fans 82 and 32.

In addition, the garment care apparatus may obtain ambient humidity of the filter based on humidity information detected by the humidity detector, and according to an identification (478) that the obtained humidity is higher than or equal to reference humidity, the garment care apparatus may stop operations of the compressor 35 and the first and second fans 82 and 32.

The ambient humidity of the filter may be an amount or ratio of water contained in surrounding air of the filter, or may be an amount or ratio of water contained in air flowing along the second duct.

According to an identification that the obtained humidity is lower than or equal to reference humidity before a preset drying time elapses from the time at which the first fan starts operating, the garment care apparatus may stop operations of the compressor 35 and the first and second fans 82 and 32.

The garment care apparatus may output a guide sound notifying filter drying completion through a speaker (not shown).

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be ROM, RAM, a magnetic tape, a magnetic disc, a flash memory, an optical data storage device, etc.

So far, the disclosed embodiments have been described with reference to the accompanying drawings. It will be apparent that those skilled in the art can make various modifications thereto without changing the technical spirit and essential features of the present disclosure. Thus, it should be understood that the embodiments described above are merely for illustrative purposes and not for limitation purposes in all aspects.

What is claimed is:

1. A garment care apparatus comprising:

a main body including a garment care room formed therein, the garment care room having a front side that is openable;

a filter installable in the main body and configured to collect dust included in air in the garment care room;

a first fan inside the main body and adjacent to the filter;

an inputter configured to receive a user command including a filter drying command;

a heat exchanger configured to perform heat exchange of the air in the garment care room, the heat exchanger including:

a compressor, and a second fan adjacent to the heat exchanger; and a controller configured to, based on receipt of the filter drying command, control an operation of at least one of the first fan, the second fan, and the compressor of the heat exchanger to dry the filter, wherein the filter includes:

a filter body, and a filter frame configured to support the filter body, the filter frame including a bending guide having a plurality of portions that are cut from only a first side of an edge of the filter frame toward a second side of the edge of the filter frame that is without cut portions so as to make the filter bendable in a direction in which the plurality of portions are cut.

2. The garment care apparatus of claim 1, wherein the bending guide further includes:

a plurality of uncut portions of the filter frame, each uncut portion between adjacent portions of the plurality of portions that are cut from the filter frame.

3. The garment care apparatus of claim 2, wherein the plurality of portions that are cut from the filter frame and the plurality of uncut portions are alternately arranged.

4. The garment care apparatus of claim 2, wherein each of the plurality of uncut portions have a quadrangle shape.

5. The garment care apparatus of claim 3, further comprising a bending maintaining member configured to maintain a bending state of the filter.

6. The garment care apparatus of claim 5, wherein the bending maintaining member includes at least one of a Velcro member, a tape, a buckle, a band, a wire, and a hinge.

7. The garment care apparatus of claim 6, wherein the bending maintaining member is configured to maintain intervals between the plurality of portions that are cut from the filter frame and the plurality of uncut portions in the bending state of the filter.

8. The garment care apparatus of claim 1, wherein the filter is formed by a fabric that is pleated and attached to the filter frame which is cut on at least one surface.

9. The garment care apparatus of claim 8, wherein spots of a hotmelt are applied onto a surface of the filter.

10. The garment care apparatus of claim 1, wherein the controller is further configured to control:

based on receipt of the filter drying command, an operation of the second fan, an operation of the compressor based on an elapse of a first reference time, and an operation of the first fan based on an elapse of a second reference time.

11. The garment care apparatus of claim 10, wherein the controller is further configured to:

perform a control operation to stop an operation of the first fan, an operation of the second fan, and an operation of the compressor of the heat exchanger based on an elapse of a drying time.

12. The garment care apparatus of claim 10, wherein the controller is further configured to control the operation of the first fan such that the first fan rotates at a reference revolution per minute (rpm) or more.

13. The garment care apparatus of claim 1, further comprising:

a detector configured to detect humidity information of air that has passed through the filter, wherein the controller is further configured to, based on humidity information detected by the detector, perform a control operation to finish a filter drying process.

14. The garment care apparatus of claim 1, wherein portions of the plurality of portions that are cut extend from the first side of the edge of the filter frame by at least ⅔ of a thickness of the first side of the filter frame.

15. The garment care apparatus of claim 1, wherein portions of the plurality of portions that are cut extend from the first side of the edge of the filter frame to within about 1 to 2 mm from a second side of the edge of the filter frame that is opposite to the first side.

16. The garment care apparatus of claim 1, further comprising:

a detector configured to detect humidity information indicative of a dryness of the filter, wherein the controller is further configured to, based on the dryness of the filter indicated by the detected humidity information being greater than or equal to a reference dryness, stop operation of the at least one of the first fan, the second fan, and the compressor.

17. The garment care apparatus of claim 1, further comprising:

a detector configured to detect humidity information indicative of an ambient humidity of the filter, wherein the controller is further configured to, based on the ambient humidity of the filter indicated by the detected humidity information being greater than or equal to a reference humidity, stop operation of the at least one of the first fan, the second fan, and the compressor.

18. The garment care apparatus of claim 1, further comprising:

a detector configured to detect humidity information indicative of an ambient humidity of the filter, wherein the controller is further configured to, based on the ambient humidity of the filter indicated by the detected humidity information being lower than or equal to a reference humidity before a drying time from which the first fan starts operating, stop operation of the first fan, the second fan, and the compressor.

* * * * *